(12) United States Patent
Meirav et al.

(10) Patent No.: US 10,913,026 B2
(45) Date of Patent: Feb. 9, 2021

(54) METHOD AND SYSTEM FOR REDUCTION OF UNWANTED GASES IN INDOOR AIR

(71) Applicant: Enverid Systems, Inc., Westwood, MA (US)

(72) Inventors: Udi Meirav, Newton, MA (US); Israel Biran, Avihayil (IL)

(73) Assignee: enverid systems, inc., Westwood, MA (US)

( * ) Notice: Subject to any disclaimer, the term of this patent is extended or adjusted under 35 U.S.C. 154(b) by 0 days.

(21) Appl. No.: 16/273,669

(22) Filed: Feb. 12, 2019

(65) Prior Publication Data
US 2019/0344211 A1 Nov. 14, 2019

Related U.S. Application Data

(63) Continuation of application No. 15/573,804, filed as application No. PCT/US2016/031923 on May 11, 2016, now abandoned.
(Continued)

(51) Int. Cl.
*B01D 53/02* (2006.01)
*B01D 53/04* (2006.01)
(Continued)

(52) U.S. Cl.
CPC ..... *B01D 53/0438* (2013.01); *B01D 53/0415* (2013.01); *F24F 11/30* (2018.01);
(Continued)

(58) Field of Classification Search
CPC ............ B01D 53/0438; B01D 53/0415; B01D 2257/504; B01D 2257/708; F24F 11/89
See application file for complete search history.

(56) References Cited

U.S. PATENT DOCUMENTS

| 1,522,480 A | 1/1925 | Allen |
| 1,836,301 A | 12/1931 | Bechthold |
| | (Continued) | |

FOREIGN PATENT DOCUMENTS

| CA | 2 640 152 A1 | 4/2010 |
| CN | 2141873 Y | 9/1993 |
| | (Continued) | |

OTHER PUBLICATIONS

Ashrae. Ansi/Ashrae Standard 62.1-2013 Ventilation for Acceptable Indoor Air Quality. American Society of Heating, Refrigerating and Air-Conditioning Engineers, Inc., Atlanta, GA; 2013, 58 pages.
(Continued)

*Primary Examiner* — Christopher P Jones
(74) *Attorney, Agent, or Firm* — Cooley LLP

(57) ABSTRACT

Some embodiments of the disclosure are directed to an air treatment system, and corresponding methodology, for at least partially removing at least one gaseous contaminant contained in indoor air of a room structured for human occupants. In some embodiments, the system may comprise an air treatment assembly having an indoor air inlet configured to receive indoor airflow directly from a room, a regenerable adsorbent material configured to adsorb at least one gaseous contaminant contained in the indoor airflow, at least one airflow element for directing the indoor airflow to flow through the air treatment assembly, an indoor air outlet for expelling the indoor air, from the air treatment assembly back into the room, a purge air inlet configured to receive and direct purge air from the room over and/or through the adsorbent material for removal of at least a portion of the at least one gaseous contaminant, and a purge air outlet for expelling the purge air out of the air treatment assembly.

15 Claims, 31 Drawing Sheets

Related U.S. Application Data

(60) Provisional application No. 62/159,825, filed on May 11, 2015.

(51) Int. Cl.

| | | |
|---|---|---|
| *F24F 11/30* | (2018.01) | |
| *F24F 11/89* | (2018.01) | |
| *F24F 110/50* | (2018.01) | |
| *F24F 110/68* | (2018.01) | |

(52) U.S. Cl.
CPC ........ *F24F 11/89* (2018.01); *B01D 2257/504* (2013.01); *B01D 2257/708* (2013.01); *F24F 2110/50* (2018.01); *F24F 2110/68* (2018.01); *Y02C 20/10* (2013.01); *Y02C 20/40* (2020.08)

(56) References Cited

U.S. PATENT DOCUMENTS

| | | |
|---|---|---|
| 2,633,928 A | 4/1953 | Chamberlain |
| 3,042,497 A | 7/1962 | Johnson et al. |
| 3,107,641 A | 10/1963 | Haynes |
| 3,344,050 A | 9/1967 | Mayland et al. |
| 3,511,595 A | 5/1970 | Fuchs |
| 3,594,983 A | 7/1971 | Yearout |
| 3,619,130 A | 11/1971 | Ventriglio et al. |
| 3,702,049 A | 11/1972 | Morris, Jr. |
| 3,751,848 A | 8/1973 | Ahlstrand |
| 3,751,878 A | 8/1973 | Collins |
| 3,795,090 A | 3/1974 | Barnebey |
| 3,808,773 A | 5/1974 | Reyhing et al. |
| 3,885,927 A | 5/1975 | Sherman et al. |
| 3,885,928 A | 5/1975 | Wu |
| 4,182,743 A | 1/1980 | Rainer et al. |
| 4,228,197 A | 10/1980 | Means |
| 4,249,915 A | 2/1981 | Sirkar et al. |
| 4,292,059 A | 9/1981 | Kovach |
| 4,322,394 A | 3/1982 | Mezey et al. |
| 4,325,921 A | 4/1982 | Aiken et al. |
| 4,409,006 A | 10/1983 | Mattia |
| 4,433,981 A | 2/1984 | Slaugh et al. |
| 4,451,435 A | 5/1984 | Hölter et al. |
| 4,472,178 A | 9/1984 | Kumar et al. |
| 4,530,817 A | 7/1985 | Hölter et al. |
| 4,551,304 A | 11/1985 | Holter et al. |
| 4,559,066 A | 12/1985 | Hunter et al. |
| 4,711,645 A | 12/1987 | Kumar et al. |
| 4,810,266 A | 3/1989 | Zinnen et al. |
| 4,816,043 A | 3/1989 | Harrison |
| 4,863,494 A | 9/1989 | Hayes |
| 4,892,719 A | 1/1990 | Gesser |
| 4,917,862 A | 4/1990 | Kraw et al. |
| 4,976,749 A | 12/1990 | Adamski et al. |
| 4,987,952 A | 1/1991 | Beal et al. |
| 5,046,319 A | 9/1991 | Jones |
| 5,087,597 A | 2/1992 | Leal et al. |
| 5,109,916 A | 5/1992 | Thompson |
| 5,137,548 A | 8/1992 | Grenier et al. |
| 5,149,343 A | 9/1992 | Sowinski |
| 5,186,903 A | 2/1993 | Cornwell |
| 5,194,158 A | 3/1993 | Matson |
| 5,221,520 A | 6/1993 | Cornwell |
| 5,231,063 A | 7/1993 | Fukumoto et al. |
| 5,281,254 A | 1/1994 | Birbara et al. |
| 5,290,345 A | 3/1994 | Osendorf et al. |
| 5,292,280 A | 3/1994 | Janu et al. |
| 5,322,473 A | 6/1994 | Hofstra et al. |
| 5,352,274 A | 10/1994 | Blakley |
| 5,376,614 A | 12/1994 | Birbara et al. |
| 5,389,120 A | 2/1995 | Sewell et al. |
| 5,407,465 A | 4/1995 | Schaub et al. |
| 5,443,625 A | 8/1995 | Schaffhausen |
| 5,464,369 A | 11/1995 | Federspiel |
| 5,471,852 A | 12/1995 | Meckler |
| 5,492,683 A | 2/1996 | Birbara et al. |
| 5,584,916 A | 12/1996 | Yamashita et al. |
| 5,614,000 A | 3/1997 | Kalbassi et al. |
| 5,646,304 A | 7/1997 | Achaiya et al. |
| 5,672,196 A | 9/1997 | Acharya et al. |
| 5,675,979 A | 10/1997 | Shah |
| 5,702,505 A | 12/1997 | Izumi et al. |
| 5,707,005 A | 1/1998 | Kettler et al. |
| 5,827,355 A | 10/1998 | Wilson |
| 5,869,323 A | 2/1999 | Horn |
| 5,876,488 A | 3/1999 | Birbara et al. |
| 5,904,896 A | 5/1999 | High |
| 5,948,355 A | 9/1999 | Fujishima et al. |
| 5,964,927 A | 10/1999 | Graham et al. |
| 5,984,198 A | 11/1999 | Bennett et al. |
| 6,024,781 A | 2/2000 | Bülow et al. |
| 6,027,550 A | 2/2000 | Vickery |
| 6,102,793 A | 8/2000 | Hansen |
| 6,113,674 A | 9/2000 | Graham et al. |
| 6,120,581 A | 9/2000 | Markovs et al. |
| 6,123,617 A | 9/2000 | Johnson |
| 6,187,596 B1 | 2/2001 | Dallas et al. |
| 6,254,763 B1 | 7/2001 | Izumi et al. |
| 6,280,691 B1 | 8/2001 | Homeyer et al. |
| 6,364,938 B1 | 4/2002 | Birbara et al. |
| 6,375,722 B1 | 4/2002 | Henderson et al. |
| 6,402,809 B1 | 6/2002 | Monereau et al. |
| 6,428,608 B1 * | 8/2002 | Shah ................ B01D 53/0462 95/123 |
| 6,432,367 B1 | 8/2002 | Munk |
| 6,432,376 B1 | 8/2002 | Choudhary et al. |
| 6,533,847 B2 | 3/2003 | Seguin et al. |
| 6,547,854 B1 | 4/2003 | Gray et al. |
| 6,605,132 B2 * | 8/2003 | Fielding ............ B01D 53/0476 454/229 |
| 6,623,550 B2 | 9/2003 | Dipak et al. |
| 6,711,470 B1 | 3/2004 | Hartenstein et al. |
| 6,726,558 B1 | 4/2004 | Meirav |
| 6,773,477 B2 | 8/2004 | Lindsay |
| 6,796,896 B2 | 9/2004 | Laiti |
| 6,797,246 B2 | 9/2004 | Hopkins |
| 6,866,701 B2 | 3/2005 | Meirav |
| 6,908,497 B1 | 6/2005 | Sirwardane |
| 6,916,239 B2 | 7/2005 | Siddaramanna et al. |
| 6,916,360 B2 | 7/2005 | Seguin et al. |
| 6,930,193 B2 | 8/2005 | Yaghi et al. |
| 6,964,692 B2 | 11/2005 | Gittleman et al. |
| 6,974,496 B2 | 12/2005 | Wegeng et al. |
| 7,288,136 B1 | 10/2007 | Gray et al. |
| 7,407,533 B2 | 8/2008 | Steins |
| 7,407,633 B2 | 8/2008 | Potember et al. |
| 7,449,053 B2 | 11/2008 | Hallam |
| 7,472,554 B2 | 1/2009 | Vosburgh |
| 7,645,323 B2 | 1/2010 | Massenbauer-Strafe et al. |
| 7,662,746 B2 | 2/2010 | Yaghi et al. |
| 7,666,077 B1 | 2/2010 | Thelen |
| 7,802,443 B2 | 9/2010 | Wetzel |
| 7,846,237 B2 | 12/2010 | Wright et al. |
| 7,891,573 B2 | 2/2011 | Finkam et al. |
| 8,157,892 B2 | 4/2012 | Meirav |
| 8,210,914 B2 | 7/2012 | McMahan et al. |
| 8,317,890 B2 | 11/2012 | Raether et al. |
| 8,398,753 B2 | 3/2013 | Sergi et al. |
| 8,491,710 B2 | 7/2013 | Meirav |
| 8,690,999 B2 | 4/2014 | Meirav et al. |
| 8,734,571 B2 | 5/2014 | Golden et al. |
| 9,316,410 B2 | 4/2016 | Meirav et al. |
| 9,328,936 B2 | 5/2016 | Meirav et al. |
| 9,399,187 B2 | 7/2016 | Meirav et al. |
| 9,566,545 B2 | 2/2017 | Meirav et al. |
| 9,802,148 B2 | 10/2017 | Meirav et al. |
| 9,919,257 B2 | 3/2018 | Meirav et al. |
| 9,939,163 B2 | 4/2018 | Meirav et al. |
| 9,950,290 B2 | 4/2018 | Meirav et al. |
| 9,976,760 B2 | 5/2018 | Meirav et al. |
| 9,987,584 B2 | 6/2018 | Meirav et al. |
| 10,046,266 B2 | 8/2018 | Meirav et al. |
| 10,086,324 B2 | 10/2018 | Meirav |
| 10,281,168 B2 | 5/2019 | Meirav et al. |
| 10,525,401 B2 | 1/2020 | Meirav et al. |

(56) References Cited

U.S. PATENT DOCUMENTS

| | | |
|---|---|---|
| 2001/0021363 A1 | 9/2001 | Poles et al. |
| 2001/0054415 A1 | 12/2001 | Hanai et al. |
| 2002/0056373 A1 | 5/2002 | Fielding |
| 2002/0078828 A1 | 6/2002 | Kishkovich et al. |
| 2002/0083833 A1 | 7/2002 | Nalette et al. |
| 2002/0147109 A1 | 10/2002 | Branover et al. |
| 2002/0183201 A1 | 12/2002 | Barnwell et al. |
| 2002/0193064 A1 | 12/2002 | Michalakos et al. |
| 2003/0037672 A1 | 2/2003 | Sircar |
| 2003/0097086 A1 | 5/2003 | Gura |
| 2003/0188745 A1 | 10/2003 | Deas et al. |
| 2004/0005252 A1 | 1/2004 | Siess |
| 2004/0020361 A1 | 2/2004 | Pellegrin |
| 2004/0069144 A1 | 4/2004 | Wegeng et al. |
| 2004/0118287 A1 | 6/2004 | Jaffe et al. |
| 2005/0133196 A1 | 6/2005 | Gagnon et al. |
| 2005/0147530 A1 | 7/2005 | Kang et al. |
| 2005/0191219 A1 | 9/2005 | Uslerighi et al. |
| 2005/0262869 A1 | 12/2005 | Tongu et al. |
| 2005/0284291 A1 | 12/2005 | Alizadeh-Khiavi et al. |
| 2005/0288512 A1 | 12/2005 | Butters et al. |
| 2006/0032241 A1 | 2/2006 | Goracharov et al. |
| 2006/0054023 A1 | 3/2006 | Raetz et al. |
| 2006/0079172 A1 | 4/2006 | Fleming et al. |
| 2006/0112708 A1 | 6/2006 | Reaves |
| 2006/0148642 A1 | 7/2006 | Ryu et al. |
| 2006/0225569 A1 | 10/2006 | Schmidt et al. |
| 2006/0236867 A1 | 10/2006 | Nealy |
| 2006/0249019 A1 | 11/2006 | Roychoudhury et al. |
| 2008/0119356 A1 | 3/2008 | Ryu et al. |
| 2008/0078289 A1 | 4/2008 | Sergi et al. |
| 2008/0127821 A1 | 6/2008 | Noack et al. |
| 2008/0135060 A1 | 6/2008 | Kuo et al. |
| 2008/0173035 A1 | 7/2008 | Thayer et al. |
| 2008/0182506 A1 | 7/2008 | Jackson et al. |
| 2008/0210768 A1 | 9/2008 | You |
| 2008/0216653 A1 | 9/2008 | Paton-Ash et al. |
| 2008/0293976 A1 | 11/2008 | Olah et al. |
| 2009/0000621 A1 | 1/2009 | Haggblom et al. |
| 2009/0044704 A1 | 2/2009 | Shen et al. |
| 2009/0071062 A1 | 3/2009 | Hedman |
| 2009/0120288 A1 | 5/2009 | Lackner et al. |
| 2009/0188985 A1 | 7/2009 | Scharing et al. |
| 2009/0220388 A1 | 9/2009 | Monzyk et al. |
| 2009/0260372 A1 | 10/2009 | Skinner et al. |
| 2010/0076605 A1 | 3/2010 | Harrod et al. |
| 2010/0154636 A1 | 6/2010 | Liu et al. |
| 2010/0224565 A1 | 9/2010 | Dunne et al. |
| 2010/0254868 A1* | 10/2010 | Obee ................ A61L 9/015 423/210 |
| 2010/0262298 A1 | 10/2010 | Johnson et al. |
| 2010/0275775 A1 | 11/2010 | Griffiths et al. |
| 2010/0278711 A1 | 11/2010 | Find |
| 2011/0064607 A1 | 3/2011 | Hedman |
| 2011/0079143 A1 | 4/2011 | Marotta et al. |
| 2011/0085933 A1 | 4/2011 | Mazyek et al. |
| 2011/0146494 A1 | 6/2011 | Desai et al. |
| 2011/0179948 A1 | 7/2011 | Choi et al. |
| 2011/0189075 A1 | 8/2011 | Wright et al. |
| 2011/0192172 A1 | 8/2011 | Delacruz |
| 2011/0206572 A1 | 8/2011 | McKenna et al. |
| 2011/0250121 A1 | 10/2011 | Schmidt |
| 2011/0262327 A1 | 10/2011 | Dillon et al. |
| 2011/0265648 A1* | 11/2011 | Meirav ................ F24F 3/0442 95/227 |
| 2011/0269919 A1 | 11/2011 | Min et al. |
| 2011/0277490 A1 | 11/2011 | Meirav |
| 2011/0296872 A1 | 12/2011 | Eisenberger |
| 2012/0004092 A1 | 1/2012 | Raatschen et al. |
| 2012/0012005 A1 | 1/2012 | Burke |
| 2012/0052786 A1 | 3/2012 | Clawsey |
| 2012/0076711 A1 | 3/2012 | Gebald et al. |
| 2012/0129267 A1 | 5/2012 | Daly |
| 2012/0137876 A1 | 6/2012 | Miller |
| 2012/0148858 A1 | 6/2012 | Wu |
| 2012/0152116 A1 | 6/2012 | Barclay et al. |
| 2012/0168113 A1 | 7/2012 | Karamanos |
| 2012/0216676 A1 | 8/2012 | Addiego et al. |
| 2012/0222500 A1 | 9/2012 | Riess et al. |
| 2012/0271460 A1 | 10/2012 | Rognili |
| 2012/0272966 A1 | 11/2012 | Ando et al. |
| 2012/0311926 A1 | 12/2012 | Mittelmark |
| 2012/0321511 A1 | 12/2012 | Lorcheim |
| 2013/0052113 A1 | 2/2013 | Molins et al. |
| 2013/0178987 A1* | 7/2013 | Meirav ................ F24F 11/65 700/276 |
| 2013/0291732 A1 | 11/2013 | Meirav |
| 2013/0331021 A1 | 12/2013 | Rodell |
| 2014/0013956 A1 | 1/2014 | Ericson et al. |
| 2014/0020559 A1* | 1/2014 | Meirav ............ B01D 53/0438 95/148 |
| 2014/0242708 A1 | 8/2014 | Lundgren |
| 2014/0298996 A1 | 10/2014 | Meirav et al. |
| 2015/0078964 A1 | 3/2015 | Meirav et al. |
| 2016/0271556 A1 | 9/2016 | Okario |
| 2016/0363333 A1 | 12/2016 | Meirav et al. |
| 2017/0227241 A1 | 8/2017 | Claesson et al. |
| 2018/0147526 A1 | 5/2018 | Meirav et al. |
| 2018/0187907 A1 | 7/2018 | Meirav et al. |
| 2018/0207574 A1 | 7/2018 | Meirav et al. |
| 2018/0236396 A1 | 8/2018 | Meirav et al. |
| 2018/0264396 A1 | 9/2018 | Meirav et al. |
| 2018/0339261 A1 | 11/2018 | Meirav et al. |
| 2018/0339262 A1 | 11/2018 | Perl-Olshvang |
| 2019/0143258 A1 | 5/2019 | Meirav et al. |
| 2019/0186762 A1 | 6/2019 | Meirav et al. |
| 2019/0247782 A1 | 8/2019 | Meirav et al. |
| 2019/0262761 A1 | 8/2019 | Meirav |
| 2019/0299154 A1 | 10/2019 | Meirav et al. |
| 2019/0346161 A1 | 11/2019 | Meirav et al. |

FOREIGN PATENT DOCUMENTS

| | | |
|---|---|---|
| CN | 2612444 Y | 4/2004 |
| CN | 2729562 Y | 9/2005 |
| CN | 1872388 A | 12/2006 |
| CN | 101001767 A | 7/2007 |
| CN | 101072620 A | 11/2007 |
| CN | 101199913 A | 6/2008 |
| CN | 101444693 A | 6/2009 |
| CN | 101500704 A | 8/2009 |
| CN | 101564634 A | 10/2009 |
| CN | 201363833 Y | 12/2009 |
| CN | 201618493 U | 11/2010 |
| CN | 102233217 A | 11/2011 |
| CN | 202032686 U | 11/2011 |
| CN | 202270445 U | 6/2012 |
| CN | 103119376 A | 5/2013 |
| DE | 102006048716 B3 | 2/2008 |
| EP | 0 475 493 A2 | 3/1992 |
| EP | 2 465 596 A1 | 6/2012 |
| ES | 2 387 791 A1 | 10/2012 |
| JP | 56-158126 A | 12/1981 |
| JP | 59-225232 A | 12/1984 |
| JP | 60-194243 A | 10/1985 |
| JP | 02-092373 A | 4/1990 |
| JP | 03-207936 A | 9/1991 |
| JP | 05-161843 A | 6/1993 |
| JP | 06-031132 A | 2/1994 |
| JP | 08-114335 A | 5/1996 |
| JP | 09-085043 A | 3/1997 |
| JP | 2000-291978 A | 10/2000 |
| JP | 2001-170435 A | 6/2001 |
| JP | 2001-232127 A | 8/2001 |
| JP | 3207936 B2 | 9/2001 |
| JP | 2005-090941 A | 4/2005 |
| JP | 2006-275487 A | 10/2006 |
| JP | 2009-150623 A | 7/2009 |
| JP | 2009-202137 A | 9/2009 |
| JP | 2010-149086 A | 7/2010 |
| JP | 2015-148227 A | 8/2015 |
| WO | WO 88/05693 A1 | 8/1988 |
| WO | WO 02/08160 A1 | 1/2002 |
| WO | WO 02/12796 A2 | 2/2002 |

(56) References Cited

FOREIGN PATENT DOCUMENTS

| | | |
|---|---|---|
| WO | WO 2006/016345 A1 | 2/2006 |
| WO | WO 2007/128584 A1 | 11/2007 |
| WO | WO 2008/155543 A2 | 12/2008 |
| WO | WO 2009/126607 A2 | 10/2009 |
| WO | WO 2010/091831 A1 | 8/2010 |
| WO | WO 2010/124388 A1 | 11/2010 |
| WO | WO 2011/114168 A1 | 9/2011 |
| WO | WO 2011/146478 A1 | 11/2011 |
| WO | WO 2012/071475 A1 | 5/2012 |
| WO | WO 2012/100149 A1 | 7/2012 |
| WO | WO 2012/120173 A1 | 9/2012 |
| WO | WO 2012/134415 A1 | 10/2012 |
| WO | WO 2012/145303 A2 | 10/2012 |
| WO | WO 2012/152930 A1 | 11/2012 |
| WO | WO 2012/158911 A2 | 11/2012 |
| WO | WO 2013/012622 A1 | 1/2013 |
| WO | WO 2013/074973 A1 | 5/2013 |
| WO | WO 2013/106573 A1 | 7/2013 |
| WO | WO 2014/015138 A2 | 1/2014 |
| WO | WO 2014/047632 A1 | 3/2014 |
| WO | WO 2014/078708 A1 | 5/2014 |
| WO | WO 2014/153333 A1 | 9/2014 |
| WO | WO 2014/176319 A1 | 10/2014 |
| WO | WO 2015/042150 A1 | 3/2015 |
| WO | WO 2015/123454 A1 | 8/2015 |
| WO | WO 2017/019628 A1 | 2/2017 |

OTHER PUBLICATIONS

Bennett, D. et al. (Oct. 2011) Indoor Environmental Quality and Heating, Ventilating, and Air Conditioning Survey of Small and Medium Size Commercial Buildings: Field Study. California Energy Commission. CEC-500-2011-043, 233 pages.

Gesser, H.D., "The Reduction of Indoor Formaldehyde Gas and that Emanating from Urea Formaldehyde Foam Insulation," Environmental International, 10:305-308 (1984).

Goeppert, A. et al., "Carbon Dioxide Capture from the Air Using a Polyamine Based Regenerable Solid Adsorbent," J. Am. Chem. Soc., 133:20164-20167 (2011).

Gray, M.L. et al., "Performance of immobilized tertiary amine solid sorbents for the capture of carbon dioxide," International Journal of Greenhouse Gas Control, 2:3-8 (2008).

Hodgson, A.T. and Levin, H. (Apr. 21, 2003) Volatile Organic Compounds in Indoor Air: A Review of Concentrations Measured in North America Since 1990. Report LBNL-51715. Berkeley, California: Environmental Energy Technologies Division, E.O. Lawrence Berkeley National Laboratory; 31 pages.

Hotchi, T. et al. (Jan. 2006) "Indoor Air Quality Impacts of a Peak Load Shedding Strategy for a Large Retail Building" Report LBNL-59293. Berkeley, California: Environmental Energy Technologies Division, E.O. Lawrence Berkeley National Laboratory; 17 pages.

Jones, C.W., "CO2 Capture from Dilute Gases as a Component of Modern Global Carbon Management," Annu. Rev. Chem. Biomol. Eng., 2:31-52 (2011).

Kang, D-H. et al. (Jun. 14, 2007) "Measurements of VOCs emission rate from building materials during bakeout with passive sampling methods" Clima 2007 WellBeing Indoors, REHVA World Congress, Jun. 10-14, 2007, Helsinki, Finland. 0. Seppänen and J. Säteri (Eds.) FINVAC [online]. Retrieved from: http://www.inive.org/members_area/medias/pdf/Inive%5Cclima2007%5CA12% 5CA12C1334.pdf, 6 pages.

Ma, C. et al., "Removal of low-concentration formaldehyde in air by adsorption on activated carbon modified by hexamethylene diamine," Carbon, 49:2873-2875 (2011).

Nuckols, M. L. et al., Technical Manual: Design Guidelines for Carbon Dioxide Scrubbers. Naval Coastal Systems Center, NCSC TECH MAN 4110, Revision A, Jul. 1985, 10 pages.

Offerman, F.J. et al. (1991) "A Pilot Study to Measure Indoor Concentrations and Emmission Rates of Polycyclic Aromatic Hydrocarbons" Indoor Air, 4:497-512.

Serna-Guerrero, R. et al., "Triamine-grafted pore-expanded mesoporous silica for CO2 capture: Effect of moisture and adsorbent regeneration strategies," Adsorption, 16:567-575 (2010).

Sidheswaran, M.A. et al., "Energy efficient indoor VOC air cleaning with activated carbon filter (ACF) filters," Building and Environment, 47:357-367 (2012).

United States Environmental Protection Agency, "Carbon Adsorption for Control of VOC Emissions: Theory and Full Scale System Performance", EPA-450/3-88-012, Jun. 1988, 84 pages.

United States Environmental Protection Agency, "EPA Ventilation and Air Quality in Offices, Fact Sheet" Air and Radiation (6609J), 402-F-94-003, Revised Jul. 1990, 4 pages.

Wu, X. et al. (2011) "Volatile Organic Compounds in Small- and Medium-Sized Commercial Buildings in California. Suporting Information" Environ Sci Technol, 45(20):S1-S29 [online]. Retrieved from: https://pubs.acs.org/doi/suppl/10.1021/es202132u/suppl_file/es202132u_si_001.pdf.

ZORFLEX® ACC, 100% Activated Woven Carbon Cloth. Calgon Carbon Corporation, 2008, www.calgoncarbon.com, 2 pages.

ZORFLEX® ACC, 100% Activated Woven Carbon Cloth, Calgon Carbon Corporation, 2011, www.calgoncarbon.com, 2 pages.

Non-Final Office Action dated Apr. 9, 2018, for U.S. Appl. No. 15/573,804, 18 pages.

Final Office Action dated Aug. 13, 2018 for U.S. Appl. No. 15/573,804, 10 pages.

International Search Report and Written Opinion for International Application No. PCT/US2016/031923, dated Oct. 5, 2016, 14 pages.

International Preliminary Examination Report on Patentability for International Application No. PCT/US2016/031923, dated Nov. 14, 2017, 10 pages.

\* cited by examiner

METHOD AND SYSTEM FOR REDUCTION OF UNWANTED GASES IN INDOOR AIR

CROSS REFERENCE TO RELATED APPLICATIONS

This application is a continuation of Ser. No. 15/573,804, entitled "Method and System for Reduction of Unwanted Gases in Indoor Air", filed Nov. 13, 2017, which is a 35 U.S.C. § 371 national stage entry of PCT/US2016/031923, which has an international filing date of May 11, 2016 and which claims priority to U.S. Provisional Patent Application No. 62/159,825, entitled "Method and System for Reduction of Unwanted Gases in Indoor Air," filed May 11, 2015. The disclosures of the above applications are incorporated by reference herein in their entireties.

TECHNICAL FIELD

Embodiments of the present disclosure generally relate to apparatuses, systems and methods for reducing unwanted gases from indoor air.

BACKGROUND

Indoor air within and around enclosed environments, such as buildings, vehicles and structures, is affected by a plurality of substances comprising contaminants. Among these contaminants, often with the highest concentration, is carbon dioxide ($CO_2$). There are other contaminants which may appear in relatively lower concentrations yet are no less important to monitor and/or reduce. A class of such contaminants is a group of species of organic vapors, broadly referred to as Volatile Organic Compounds (VOC). Contaminating gases (e.g., $CO_2$) and VOCs, and corresponding vapors thereof, may collectively be referred to as a "gas(es)". The sources of these contaminants include, inter alia, the human occupants themselves—from respiration and perspiration to clothing and cosmetics—as well as building materials, equipment, food and consumer products, cleaning materials, office supplies or any other materials which emit VOCs. Other classes of contaminants are inorganic compounds and microorganisms such as bacteria, viruses, mold, fungi and airborne particles. Additional gaseous contaminants may be sulfur oxides, nitrous oxides, radon, or carbon monoxide.

SUMMARY OF DISCLOSURE

According to some embodiments of the present disclosure, systems and methods are described for maintaining good air quality in an enclosed environment. According to some embodiments, the good air quality may be maintained by an air treatment system configured for maintaining at least one gaseous contaminant concentration contained in indoor air of the enclosed environment below a predetermined gaseous contaminant concentration.

According to some embodiments of the present disclosure, there is described an air treatment system for at least partially removing at least one gaseous contaminant contained in indoor air of an enclosed environment. In some embodiments, the system comprises an air treatment assembly that includes an indoor air inlet configured to receive indoor airflow from the enclosed environment, a regenerable adsorbent material configured to adsorb at least one gaseous contaminant contained in the indoor airflow, and an indoor air outlet configured for expelling the indoor air treated by the adsorbent material from the air treatment assembly back into the room. In some embodiments, the assembly also contains a purge air inlet or purge valve, wherein the purge air inlet comprising or optionally separate from the indoor air inlet, the purge air inlet or valve configured during a regeneration mode to direct air from the enclosed environment over and/or through the adsorbent material as a purging air flow for removal of at least a portion of the at least one gaseous contaminant adsorbed by the adsorbent material. In some embodiments, the assembly further comprises an outlet configured for expelling the purging airflow from the air treatment assembly to an external environment. In some embodiments, the air treatment assembly contains a controller system configured to allow at least one of flow of the indoor airflow in the indoor air inlet, the adsorption of the at least one gaseous contaminant contained in the indoor airflow, and/or the expulsion of the indoor air treated by the adsorbent material during an adsorption mode of the air treatment system back into the enclosed environment, and flow of the purging airflow over and/or through the adsorbent material, and/or the expulsion of the purging air from the air treatment assembly to the external environment during the regeneration mode.

In some embodiments, an air treatment system comprising an air treatment assembly and a controller system is disclosed. The air treatment assembly may include one or more air inlets configured to receive airflow from an enclosed environment; a regenerable adsorbent material; at least one airflow element for directing the airflow to flow through the air treatment assembly; an indoor air outlet for expelling the airflow, treated by the regenerable adsorbent material, from the air treatment assembly; and a purge air outlet for expelling a purging airflow out of the air treatment assembly. In some embodiments, the air treatment system is configured to operate cyclically in at least two modes, an adsorption mode wherein: a first air inlet of the one or more air inlets is configured to receive indoor airflow from the enclosed environment, and the regenerable adsorbent material is configured to adsorb at least one gaseous contaminant contained in the indoor airflow, and a regeneration mode wherein: a second air inlet of the one or more air inlets is configured to receive indoor airflow as the purging airflow, the purging airflow configured to regenerate the regenerable adsorbent material by removing at least a portion of the at least one gaseous contaminant adsorbed by the regenerable adsorbent material. In some embodiments, the controller system is configured for controlling at least the cyclic operation of the adsorption mode and the regeneration mode cycle by controlling the at least one airflow element.

In some embodiments, the second air inlet may be the same as the first air inlet. In other embodiments, the first air inlet and the second air inlet may join to form a single air inlet for receiving indoor airflow into the air treatment assembly. Further, the indoor air outlet may be configured to expel the treated airflow into the enclosed environment.

In some embodiments, the air treatment system may further comprise a closed loop return path for connecting the purge air outlet to the second air inlet so that at least a portion of the expelled purging airflow re-enters the air treatment assembly via the second air inlet. In such embodiments, the air treatment system may further include one or more sensors for measuring a concentration of gaseous contaminant in the expelled purging airflow, wherein an amount of the portion of the expelled purging airflow is determined by the controller system based on a measurement of the one or more return path sensors. In addition, the air treatment system may further include a return path airflow element, wherein the controller system is configured to control the amount of the portion of the expelled purging airflow using the return path airflow element.

In some embodiments, the air treatment system may further comprise a fan-coil unit operationally coupled to the air treatment assembly and located within or adjacent to the enclosed environment, wherein the indoor air outlet is configured to expel the treated airflow so as to direct the treated airflow into or towards the fan-coil unit. In addition, the air treatment system may also include an air handling unit (AHU) operationally coupled to the air treatment assembly and configured to at least one of heat and cool the treated airflow, wherein the indoor air outlet is configured to expel the treated airflow so as to direct the treated airflow into or towards the AHU. The AHU may also be configured to at least one of heat and cool the treated air, wherein the air treatment assembly is arranged within AHU.

In some embodiments, the air treatment system may also include one or more sensors for measuring a concentration of the at least one gaseous contaminant and/or detecting a presence of the at least one gaseous contaminant, wherein the one or more sensors are configured to generate a signal corresponding to the concentration of the at least one gaseous contaminant and/or the presence of the at least one gaseous contaminant, and transmit the signal to the controller system. The at least one airflow element may comprise at least one of a fan, a blower, a damper and a shutter. In some embodiments, the air treatment system may further comprise a heat source for heating the purging airflow, the heat source selected from the group consisting of: a heat pump, a furnace, solar heat, an electrical coil and hot water. In some embodiments, the air treatment assembly may be configured as a portable unit. In some embodiments, the air treatment system may have a heat exchanger configured to transfer heat from the purging airflow exiting the air treatment assembly to an indoor air incoming as a fresh purging airflow.

In some embodiments, the gaseous contaminant may be selected from the group consisting of: carbon dioxide, volatile organic compounds, formaldehyde, sulfur oxides, radon, ozone, nitrous oxides and carbon monoxide. Further, the adsorbent material may include at least one of: activated carbon, carbon particles, solid amines, solid supported amine, molecular sieves, porous silica, porous alumina, carbon fibers, metal organic frameworks, porous polymers and polymer fibers.

In some embodiments of the present disclosure, an air treatment system comprising: an air treatment assembly is disclosed. The air treatment assembly is configured to include an indoor air inlet configured to receive indoor airflow from an enclosed environment; a regenerable adsorbent material configured to adsorb at least one gaseous contaminant contained in the indoor airflow; an indoor air outlet for expelling the indoor airflow treated by the adsorbent material from the air treatment assembly back into the enclosed environment; a purge air inlet configured to receive and direct indoor air from the enclosed environment over and/or through the adsorbent material as a purging airflow for removing at least a portion of the at least one gaseous contaminant adsorbed by the adsorbent material; a purge air outlet for expelling the purging airflow out of the air treatment assembly, and a heat exchanger configured to transfer heat from the purging airflow exiting the air treatment assembly to an indoor air incoming as a fresh purging airflow.

In some embodiments, the configuration of the heat exchanger is selected from the group consisting of: a shell and tube configuration, an air coil configuration, a plate configuration, a counter-flow configuration and a fin configuration. In addition, the heat exchanger is further configured to allow the exiting purging airflow to combine with the incoming purging airflow.

In some embodiments, the air treatment system may further comprise: an incoming purging airflow conduit for transferring incoming purging airflow from the heat exchanger to the air treatment assembly, and an exhausted purging airflow conduit for transferring exiting purging airflow from the air treatment assembly to the heat exchanger. It may also include one or more sensors for measuring a concentration of gaseous contaminant in the airflow, wherein the heat exchanger is configured to allow the exiting purging airflow to combine with the incoming purging airflow based on a measurement of the one or more sensors.

In some embodiments, an air treatment method comprising one or more steps is disclosed. The steps include: receiving indoor airflow from an enclosed environment through an indoor air inlet; directing the indoor airflow by at least one airflow element to flow through a regenerable adsorbent material; adsorbing, during an adsorption mode, at least one gaseous contaminant contained in the indoor airflow by the regenerable adsorbent material; expelling the indoor airflow treated by the adsorbent material via an indoor air outlet; receiving and directing, during a regeneration mode, indoor air as an incoming purging airflow over and/or through the adsorbent material for removal of at least a portion of the at least one gaseous contaminant adsorbed by the adsorbent material; expelling the purging airflow out of the adsorbent material; and controlling at least an operation of the adsorption mode and/or the regeneration mode by controlling at least one airflow element.

In some embodiments, the incoming purging airflow may be received and directed over and/or through the adsorbent material via the indoor air inlet. In yet some embodiments, the incoming purging airflow may be received and directed over and/or through the adsorbent material via a purging airflow inlet separate from the indoor air inlet. The steps may further include the step of returning at least a portion of the expelled purging airflow back into the incoming purging airflow via a closed loop return path configured to connect the expelled purging airflow with the incoming purging airflow. In addition, the expelled indoor airflow treated by the adsorbent material may be transferred to a fan-coil unit located within or adjacent to the enclosed environment. In some embodiments, the expelled indoor airflow treated by the adsorbent material may be transferred to an air handling unit (AHU) configured to at least one of heat and cool the treated airflow.

In some embodiments, the steps of the method may be further comprise measuring a concentration of the at least one gaseous contaminant and/or detecting a presence of the at least one gaseous contaminant with one or more sensors, and transmitting a signal generated by the one or more sensors and corresponding to the concentration of the at least one gaseous contaminant and/or the presence of the at least one gaseous contaminant to a controller system. In addition, the method may include the step of facilitating thermal communication of the expelled purging airflow with the incoming purging airflow so as to effect transfer of heat between the expelled purging airflow and the incoming purging airflow. Further, the method may comprise the step of heating the purging airflow using a heat source selected from the group consisting of: a heat pump, a furnace, solar heat, an electrical coil and hot water.

In some embodiments of the method, the gaseous contaminant may be selected from the group consisting of: carbon dioxide, volatile organic compounds, formaldehyde, sulfur oxides, radon, ozone, nitrous oxides and carbon monoxide. The adsorbent material may comprise at least one of: activated carbon, carbon particles, solid supported amine, molecular sieves, porous silica, porous alumina, carbon fibers, metal organic frameworks, porous polymers and polymer fibers. In addition, the at least one airflow element may comprise at least one of a fan, a blower, a damper and a shutter.

BRIEF DESCRIPTION OF THE DRAWINGS

The principals and operations of the systems, apparatuses and methods according to some embodiments of the present disclosure may be better understood with reference to the drawings, and the following description. These drawings are given for illustrative purposes only and are not meant to be limiting.

DETAILED DESCRIPTION

Figure 1A:
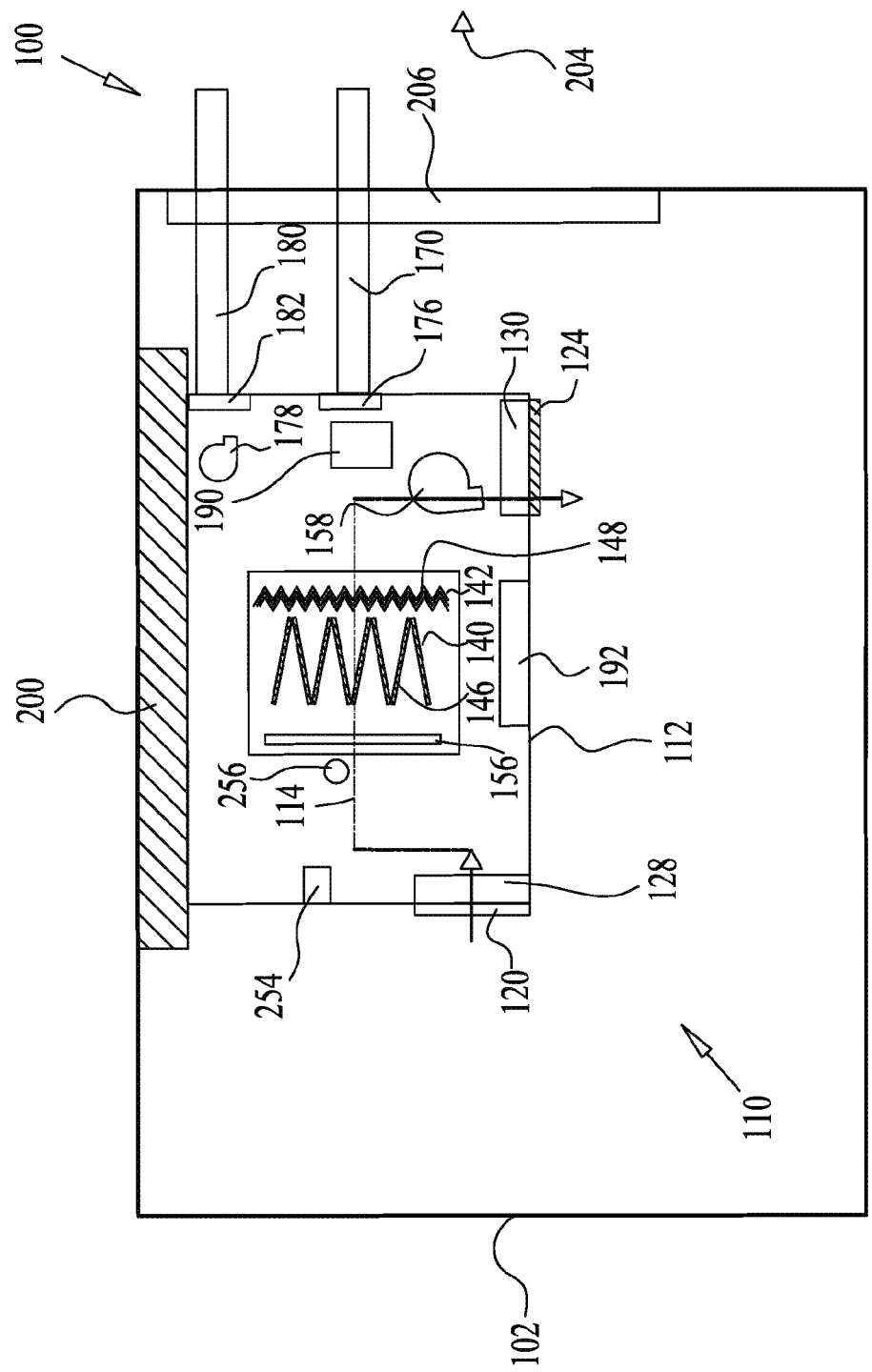
FIGS. 1A-D are simplified schematic illustrations of a system for reducing unwanted gases in indoor air at a first operational mode (FIG. 1A), a second operational mode (FIGS. 1B and D), and one of the two operational modes (FIG. 1C) according to some embodiments of the present disclosure.
Figure 1B:
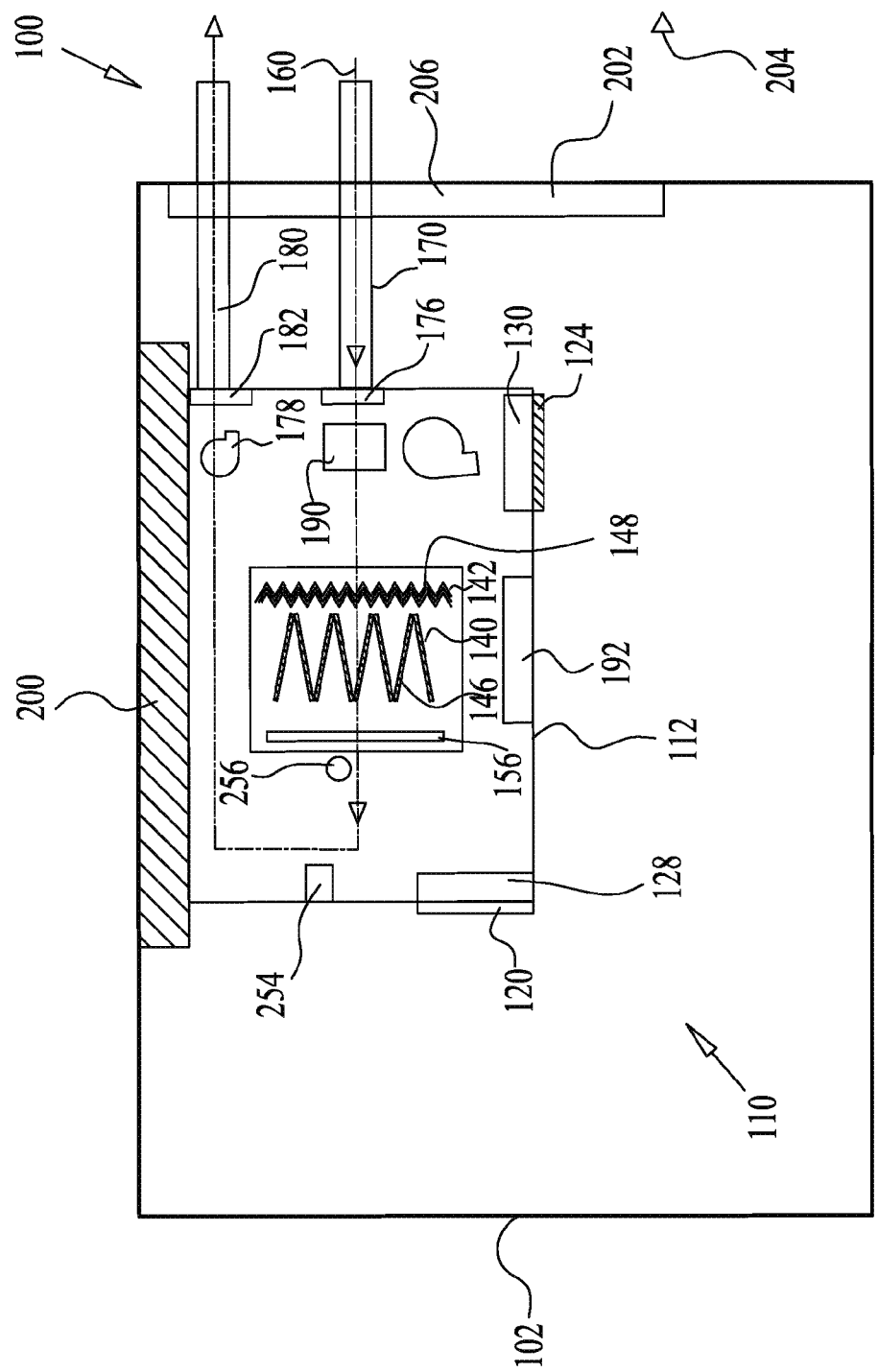

FIGS. 1A and 1B are simplified schematic illustrations of a system 100 for reducing unwanted gases in indoor air of an enclosed environment 102 at a first operational mode and a second operational mode according to some embodiments of the present disclosure, respectively.

The enclosed environment 102 may comprise a commercial environment or building; an office building; a residential environment or building; a house; a school; a factory; a hospital; a store; a mall; an indoor entertainment venue; a storage facility; a laboratory; a vehicle; a vessel including an aircraft, a ship, a sea vessel or the cabin of a sea vessel; a bus; a theatre; a partially and/or fully enclosed arena; a tent; an education facility; a library; and/or other partially and/or fully enclosed structure and/or facility which can be at times occupied by equipment, materials, live occupants (e.g., humans, animals, synthetic organisms, etc.), etc., and/or any combination thereof.

According to some embodiments, the enclosed environment 102 may comprise a plurality of indoor spaces such as rooms, cubicles, zones in a building, compartments, railroad cars, caravans or trailers, for example, and may be referred to as "indoor spaces".

In some embodiments of the present disclosure, an air treatment assembly 110 may be provided to reduce the concentration of contaminants contained in the airflow introduced therein, thereby removing from the enclosed environment 102 the unwanted gases containing the contaminants. The airflow may be indoor air 114 from the enclosed environment 102.

The air treatment assembly 110 may comprise a housing 112. The indoor air 114 may flow into the housing 112 of the air treatment assembly 110, via an indoor air inlet 120 and may exit the air treatment assembly 110 following treatment therein, via an indoor air outlet 124. An indoor air inlet damper 128 may be provided to control the volume of incoming indoor air 114. An indoor air outlet damper 130 may be provided to control the volume of the treated indoor airflow, expelled from the air treatment assembly 110, into the enclosed environment 102.

In some embodiments, indoor air 114 that enters the air treatment assembly 110 through the indoor air inlet 120 may be used as a purging airflow to regenerate adsorbent materials used to adsorb and remove gaseous contaminants from indoor air. As such, as shown in FIG. 1E, the same inlet can be used as an inlet for both indoor air to be treated by the air treatment system and indoor air to be used as a purging airflow. As discussed with reference to FIG. 1C below, the controller may determine whether the incoming indoor air may be used as a purging gas or not. For example, based on gaseous contaminant measurements (of the incoming indoor air and/or the sorbents) as detected by one or more sensors, the controller may determine that the incoming indoor air should be used as a purging gas or it should be directed to flow through the adsorbent of the air treatment system so as to have at least some of the contaminants adsorbed by the adsorbent.

In some embodiments, there may be more than one inlets, each configured to be used as an inlet for indoor air to be treated or scrubbed by the air treatment system or indoor air to be used as a purging airflow. For example, as shown in FIG. 1F, an air treatment system may include a pair of inlets, one to receive indoor air for scrubbing and the second to receive indoor air as a purging gas. In some embodiments, each indoor air inlet may be provided with a damper to control the volume of incoming indoor air. In some embodiments, some or all of the more than one inlets may combine into a single inlet. For example, some or all of the inlets configured for receiving indoor air to be scrubbed may combine into a single inlet when joining the air treatment assembly, and ditto with the inlets configured for receiving purging indoor airflow. In some embodiments, inlets configured for receiving purging indoor air and indoor air for scrubbing may also be combined into a single inlet prior to joining the assembly. For example, as shown in FIG. 1G, an inlet for receiving indoor air for scrubbing by an adsorbent and an inlet for receiving indoor air for use as a purging airflow may be combined into a single inlet prior to joining the air treatment assembly.

Within housing 112 there may be provided a $CO_2$ sorbent section 140 configured to scrub $CO_2$ from the indoor air 114 and/or a VOC sorbent section 142 configured to scrub VOCs from the indoor air 114. The sorbents including adsorbent materials may also be considered and referred to as scrubbers. Examples of adsorbent material based scrubbers are disclosed in applicant's U.S. Pat. Nos. 8,157,892 and 8,491,710, which are incorporated herein by reference in their entireties. The scrubbers may comprise any suitable material for capturing undesired contaminants from the indoor air 114 flowing therein. For example, the scrubber may comprise an adsorbent material including a solid support, supporting an amine-based compound, such as disclosed in applicant's PCT application PCT/US12/38343, which is incorporated herein by reference in its entirety.

Adsorbent materials may also include, but are not limited to, clays, molecular sieves, zeolites, various forms of silica and alumina, porous silica, porous alumina, various forms of carbon, activated carbon, carbon fibers, carbon particles, titanium oxide, porous polymers, polymer fibers and metal organic frameworks.

Adsorbent materials selective to VOCs may also include, but are not limited to molecular sieves, activated carbon, zeolites, carbon fibers and carbon particles, for example.

In some embodiments more than one type of adsorbent material is used.

The $CO_2$ adsorbent section 140 may include a plurality of $CO_2$ scrubbing cartridges 146 arranged in any suitable arrangement. For example, the $CO_2$ scrubbing cartridges 146 may be arranges as parallel plates and/or arranged in a staggered, v-bank formation. This staggered arrangement allows substantially parallel airflow paths of the indoor air 114 through the plurality of the $CO_2$ scrubbing cartridges 146.

The VOC sorbent section 142 may include one or more VOC scrubbing cartridges 148 arranged in any suitable arrangement. For example, the VOC scrubbing cartridges 148 may be arranges as parallel plates and/or arranged in a staggered, v-bank formation. This staggered arrangement allows substantially parallel airflow paths of the indoor air 114 through the plurality of the VOC scrubbing cartridges 148. In some embodiments the VOC scrubbing cartridge 148 has a pleated or otherwise folded configuration to increase the surface area thereof.

Exemplary scrubbing cartridges and modules are disclosed in applicant's US Patent Publication No. 20110198055, which is incorporated herein by reference in its entirety.

Additional air treatment functionalities may be employed for removing other contaminants from the indoor air 114, shown in a dashed line. In some embodiments, the air treatment assembly 110 may comprise any thin permeable sheet structure, carbon fibers and/or particles attached to a sheet of some other permeable material such as paper, cloth or fine mesh, for example, and shown as a filter 156.

In some embodiments, the air treatment assembly 110 may include catalysts that cause change or decomposition of certain molecules, such as, for example, VOCs or ozone. Such catalysts may include, but are not limited to, any of a number of metal oxides or porous heavy metals. In some embodiments, the air treatment assembly 110 may include plasma or ionizers that generate ions, which in turn can serve to eliminate VOCs or microorganisms. Similarly, ultraviolet radiation can be employed to destroy microorganisms or activate certain catalytic processes.

Figure 1C:
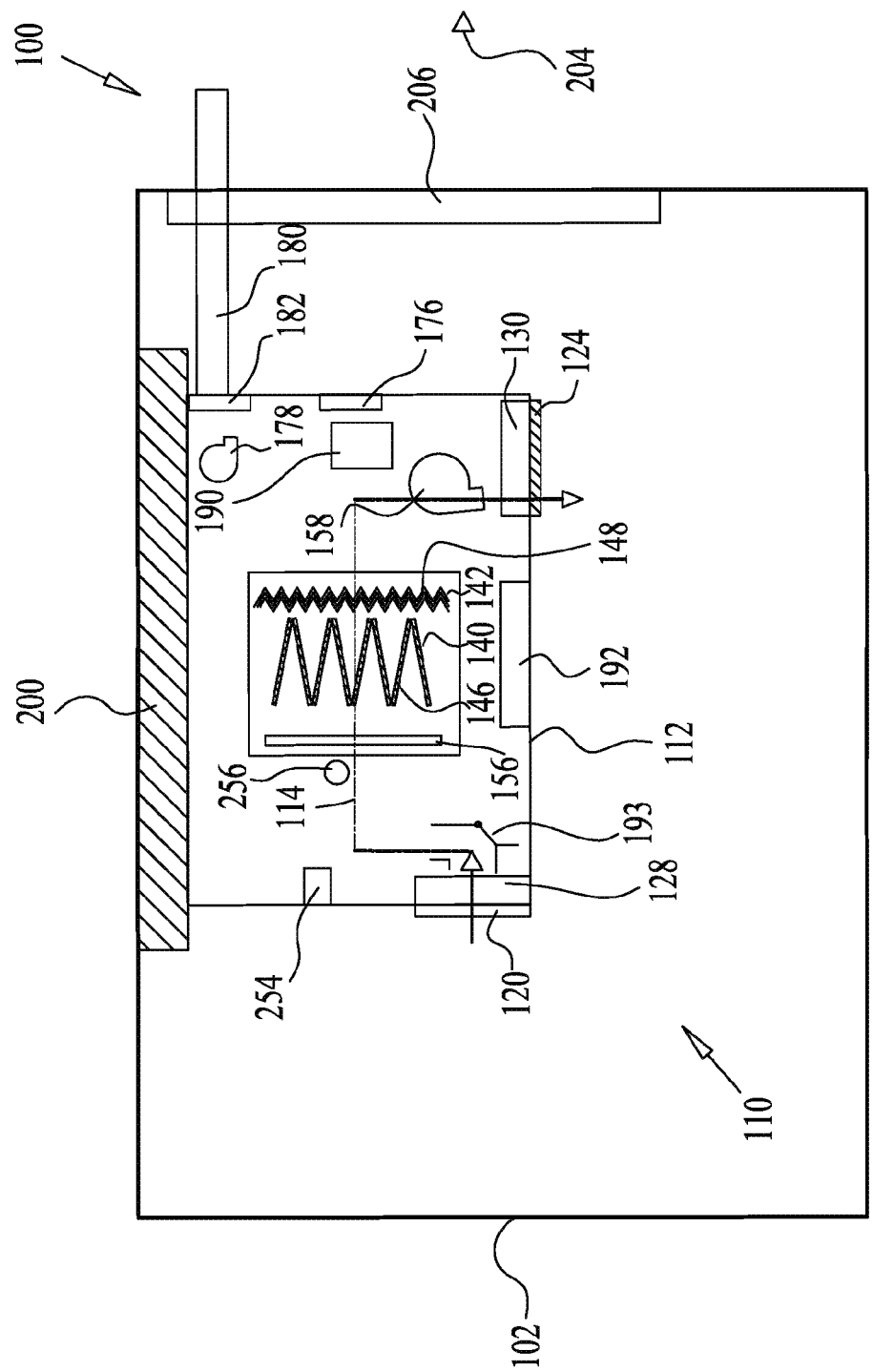

Operation of the air treatment assembly 110 may comprise an adsorption cycle, i.e. an adsorption mode (also known as a scrub cycle), as shown in FIG. 1A, and a regeneration mode (also known as a purge cycle or purge mode), as shown in FIGS. 1B and 1C. The operation of the air treatment assembly 110 may be cyclic by alternating between the adsorption mode, the regeneration mode and/or any other mode, repeatedly.

In some embodiments, the air treatment assembly 110 may be configured to adsorb the contaminants during the adsorption cycle and the adsorbent material may be regenerated during the regeneration cycle. The air treatment assembly 110 may be configured to repeatedly alternate at least between the adsorption cycle and the regeneration cycle.

During the scrub cycle (FIG. 1A), the contaminants are captured and adsorbed by the adsorbent material or any other means. A portion of the indoor air 114 may be urged by an airflow element provided for directing the indoor air to flow into the air treatment assembly 110. The airflow element may comprise, for example, a fan 158 or a blower. The indoor air 114 may flow into the air treatment assembly 110, via indoor air inlet 120 and air inlet damper 128, when positioned at least partially in an open state. The indoor air inlet 120 may be formed with a grille.

The fan 158 may be placed in any suitable location within the housing 112, such as upstream in a "push" mode, i.e. intermediate the indoor air inlet 120 and $CO_2$ adsorbent section 140. Alternatively, as seen in FIG. 1A, the fan 158 may be placed downstream in a "pull" mode i.e. after the $CO_2$ adsorbent section 140.

The rate and/or volume of the indoor air 114 flowing into the air treatment assembly 110 may be controlled by the fan 140 and/or air inlet damper 128, or by any other suitable means.

In some embodiments a portion of a volume of the indoor air 114 may be directed into the air treatment assembly 110 for treatment thereof. The volume of the indoor air 114 may comprise a reference volume which may include the overall volume of the indoor air within the enclosed environment 102 or the indoor spaces therein. In a non-limiting example, when the enclosed environment 102 is a room (e.g. a classroom, a lecture hall), the reference air volume is the overall volume of the indoor air within the room.

In some embodiments, about 1%-50% of the indoor air reference volume may be directed into the air treatment assembly 110 during a predetermined time period (e.g. an hour, day etc.). In some embodiments, about 1%-25% of the indoor air reference volume may enter the air treatment assembly 110 during a predetermined time period. In some embodiments, about 1%-10% of the indoor air reference volume may enter the air treatment assembly 110 during a predetermined time period.

The indoor air 114 may flow through the filter 156, $CO_2$ adsorbent section 140 and/or the VOC adsorbent section 142. The now scrubbed air may flow out of the air treatment assembly 110 via the indoor air outlet 124 and indoor air outlet damper 130, when positioned, at least partially, in an open state. The indoor air outlet 124 may be formed with a grille.

The treated air exiting the air treatment assembly 110 may be expelled into the enclosed environment 102.

Figure 9:
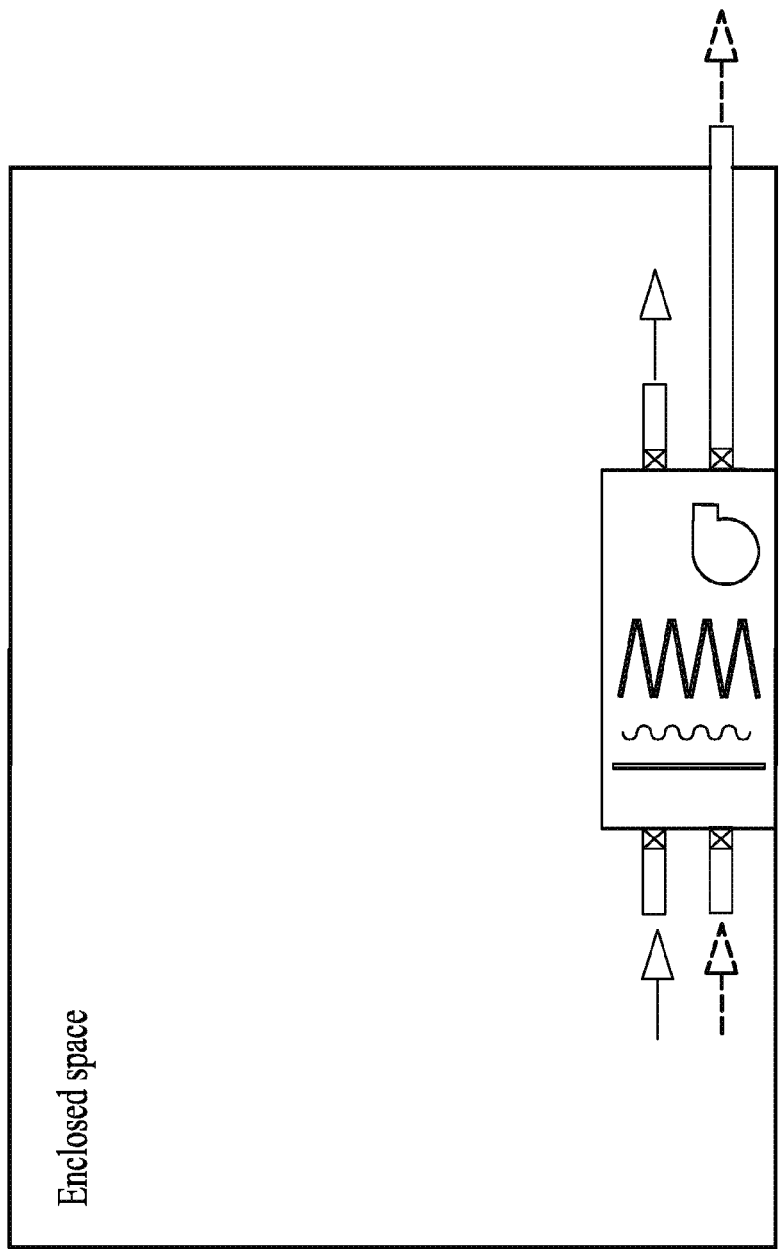
FIGS. 9-15 show several schematic illustrations of embodiments of settings in which the air treatment assembly disclosed herein may be associated with other air management systems.

According to some embodiments of the present disclosure, the air treatment assembly 110 may be configured to operate independently, i.e. without association with an air management system or disconnectedly from an air management system. For example, as shown in FIG. 9, a standalone air treatment assembly may be located within an enclosed space for use in reducing unwanted gases in the indoor air. The inlet(s) for indoor air to be scrubbed and indoor air to be used as purging gas airflow terminate inside the enclosed space and as such receive indoor air for such purposes. In some embodiments, an outlet for exhaust purging airflow may terminate outside the enclosed space so as to discard the exhausted purging airflow.

An air management system may comprise a system which circulates indoor air and conditions indoor air. Conditioning indoor air may comprise changing the temperature and/or humidity of the indoor air. The air management system may comprise an air conditioning system, such as a Heating, Ventilation and Air-Conditioning ("HVAC") system which may include a centralized air conditioning system, a fan-coil system, and/or a unit-ventilator system. The centralized air conditioning system generally includes ductwork for flow of the indoor air therein to an air handling unit which conditions the air therein. The conditioned air flows out of the air handling unit to the enclosed environment, thereby circulating the indoor air. The fan-coil system generally includes a fan-coil unit comprising a fan for drawing the indoor air and heating and cooling coils for conditioning the air and returning the conditioned air to the enclosed environment, thereby circulating the indoor air. The air conditioning system may also comprise fresh air ducts for introducing fresh, unconditioned air into the enclosed environment. The air conditioning system may also comprise one or more air exhausts (which may include corresponding ducts; and may also be referred to as one or more outlets) for exhausting air out of the enclosed environment for maintaining the pressure equilibrium within the enclosed environment. Various embodiments of settings in which the air treatment assembly 110 may be associated with other air management system are shown in FIGS. 9-16.

According to some embodiments, the air treatment assembly 110 of the present disclosure is configured to direct the indoor air therein without being dependent on the ducts and/or fans of the air management system. Thus the air treatment assembly 110 may operate in an enclosed environment that is not equipped with an air management system. The air treatment assembly 110 may also operate in an enclosed environment that is equipped with an air management system, yet the air treatment assembly 110 operates independently and discontentedly from the air management system.

The air treatment assembly 110 is formed with its fan, such as fan 158 and its inlets and outlets, such as indoor air inlet 120 and indoor air outlet 124 for operation thereof independently of an air management system. In some embodiments, the air treatment assembly 110 comprises its controller 254 for controlling the operation of the air treatment assembly 110, as will be further described.

Treating the indoor air 114 within the air treatment assembly 110 by scrubbing the contaminants therefrom may be greatly advantageous for maintaining good air quality.

In some embodiments, good air quality may include air with a $CO_2$ concentration of less than 2500 ppm. In some embodiments, good air quality may include air with a $CO_2$ concentration of less than 2000 ppm. In some embodiments, good air quality may include air with a $CO_2$ concentration of less than 1500 ppm. In some embodiments, good air quality may include air with a $CO_2$ concentration of less than 1000 ppm.

Following the capture and scrubbing of the contaminants in the adsorption cycle, the adsorbent material may be regenerated during the regeneration cycle by urging the release of the contaminants from the adsorbent material.

The regeneration may be performed in any suitable manner. For example, in some embodiments, regeneration may be performed by streaming a purge gas 160 (FIGS. 1B and 1D) over and/or through the adsorbent material for release of at least a portion of the contaminants therefrom. In some embodiments, the purge gas 160 may be exhausted out of the enclosed environment 102. During the regeneration cycle, the purge gas 160 may flow into the air treatment assembly 110, via a purge gas inlet 170, such as a purge air inlet or purge valve. The purge gas inlet 170 may be associated with a purge gas inlet damper 176. The purge gas 160 may flow into the air treatment assembly 110 when the damper 176 is positioned, at least partially, in an open state, while the air inlet damper 128 and air outlet damper 130 may be closed. An additional fan 178 may be provided for urging flow of the purge gas 160 into the air treatment assembly 110. The fan 178 may be placed in any suitable location, such as in proximity to a purge gas exhaust 180. Alternatively, the fan 178 may be omitted, such as when fan 158 may be used for directing the purge gas 160 into the air treatment assembly 110. The purge gas 160 may exit from the air treatment assembly 110, via purge gas exhaust 180 and a purge gas exhaust damper 182. The purge gas exhaust 180 may comprise a purge air outlet for expelling the purge gas 160 out of the air treatment assembly.

Purge gas inlet damper 176 may be provided to control the volume of the purge gas 160 entering the air treatment assembly 110 and purge gas exhaust damper 182 may be provided to control the volume of the purge gas 160 exiting therefrom.

Thus, in some embodiments, it is seen that switching the air treatment assembly 110 operation from the adsorption cycle to the regeneration cycle may be performed by the dampers and/or fans or any other suitable means.

In accordance with some embodiments the purge gas 160 comprises purge air.

The purge air may be provided to the air treatment assembly 110 from any source of air, such as outdoor air. For example, the source of outdoor air may be ambient air flowing directly from the outdoor ambient, i.e. outside the enclosed environment 102, into the air treatment assembly 110, as shown in FIGS. 1A-B, 2A-B, 3A-B, 4A-B and 5A-5B. Alternatively, the outdoor air may flow from the ambient environment into the air treatment assembly 110 via ducts (not shown). Additionally, the source of outdoor air may be from other locations in the enclosed environment 102, such as from an enclosed environment pier. In some embodiments, the source of the purge air may be indoor air from the enclosed environment, as shown in FIGS. 1C-D, 2C, 3C, 4C and 5C.

In some embodiments, the purge air may be provided to the air treatment assembly 110 from air already circulating in the enclosed environment 102. For example, a portion or all of indoor air 114 that flows into the air treatment assembly 110, via indoor air inlet 120 and air inlet damper 128 when positioned at least partially in an open state, may be redirected so as to serve as purge air. Referring to FIG. 1C, in some embodiments, the air treatment assembly 110 may comprise a switch 193 for determining the direction of flow of the incoming indoor air 114. For example, during the adsorption mode of the air treatment system when at least one gaseous contaminant is adsorbed by an adsorbent material, the switch 193 may direct the flow of indoor air 114 for treatment by the air treatment assembly 110 as shown in, for example, FIG. 1A. In some embodiments, the air treatment system may be in a regeneration mode to regenerate the adsorbent material by the removal of at least a portion of the at least one gaseous contaminant adsorbed by the adsorbent material. In such embodiments, the switch 193 may divert the indoor air 114 to serve as a purge air during the regeneration cycle of the air treatment system.

In some embodiments, the controller 254 of the air treatment assembly 110 may determine whether the indoor air 114 should serve as a purge air. In some embodiments, such determinations may be made based on indoor air 114 quality measurements as performed by sensors 256 located in any suitable location within the enclosed environment 102 or in proximity thereto so as to obtain the measurements. The sensors 256 may be configured to generate output data that can be transmitted to the control system or controller 254 for processing thereof upon detection of some concentration of contaminants, substances, gases, etc., in the indoor air 114 that exceeds a threshold for utilizing the indoor air 114 as a purge air. In some embodiments, the controller 254 may be configured to instruct the switch 193, upon receiving such information, to not allow the indoor air 114 to be diverted as a purge air.

In some embodiments, a closed loop return path may be used to recycle purging gas airflow after the purging gas has been used to regenerate the adsorbents by flowing through the adsorbents. For example, as shown in FIG. 1H, a closed loop return path may return exhaust purge pas airflow back into the inlet for indoor purge gas so that the recycled purging gas airflow may be used again to regenerate the adsorbent(s) in the air treatment assembly. In some embodiments, whether to recycle a purging gas airflow or not may be determined by the controller based on purging gas airflow contaminant level measurements obtained from one or more sensors associated with the air treatment system. For example, if the gaseous contaminant level in the exhausted purging gas airflow is below some threshold level, then the exhausted purging airflow may be reused as purging gas airflow by returning it back into the purging gas inlet via the closed loop return path. In some embodiments, the closed loop return path may be provided with dampers to control the flow of the exhausted purge gas airflow into and out of the closed loop.

Although FIG. 1H shows a closed loop return path connecting the inlet and outlet of indoor air, in some embodiments, the inlet for indoor air to be scrubbed and the outlet for releasing the treated air may also be connected via another closed loop return path. Such a path may be used, for example, to rerun the treated air through the air treatment assembly. For example, based on a reading from one or more sensors, it may be determined (e.g., by a controller) that the contaminant level of the treated air is still above some threshold or acceptable value. In such embodiments, the treated air to be exited through the outlet for releasing treated air may instead be recycled back into the air treatment assembly via the indoor air inlet and may be scrubbed again by the adsorbents.

Figure 1D:
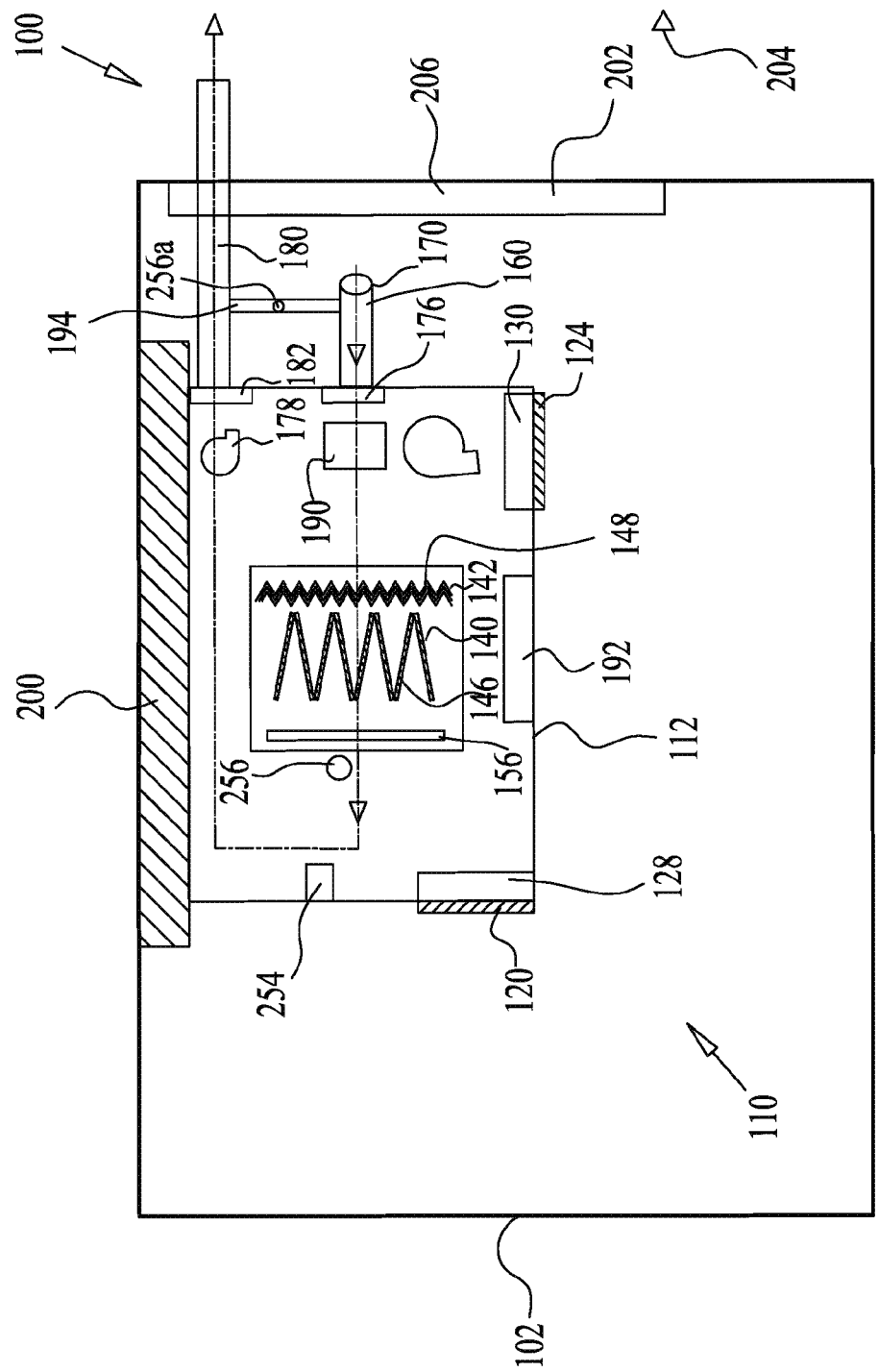
Figure 1E:
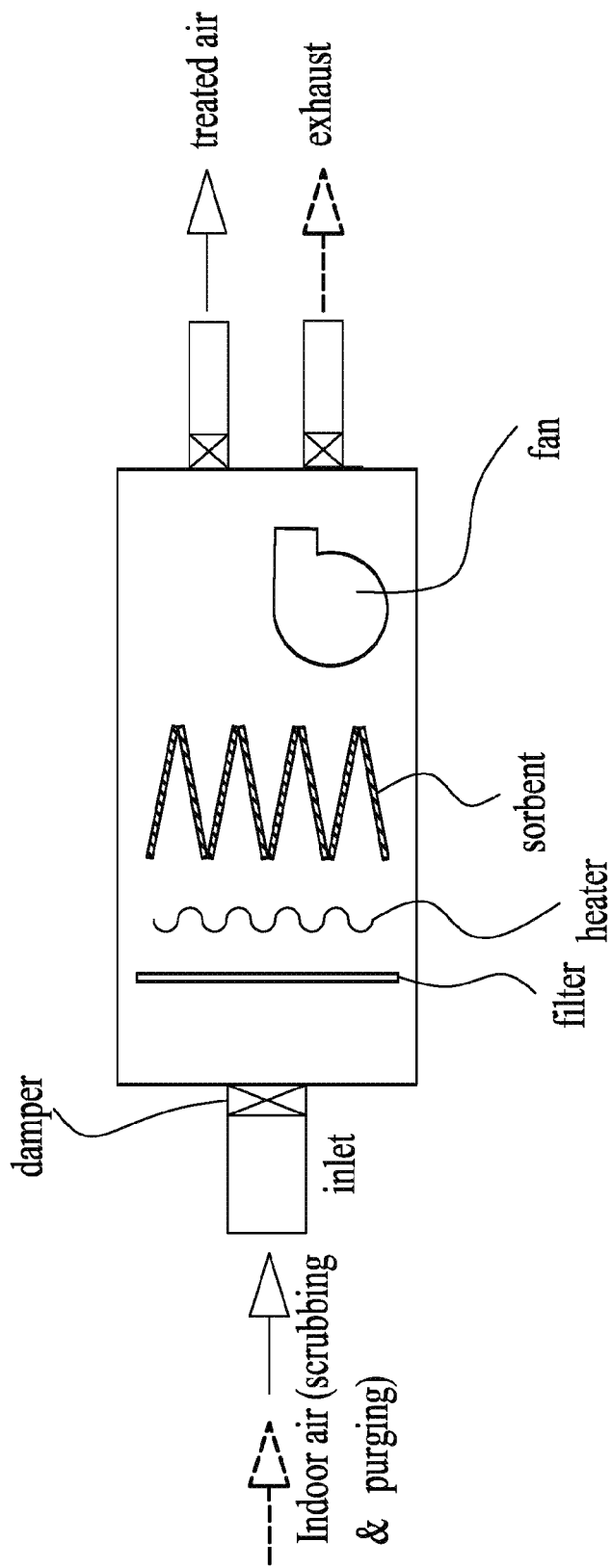
FIGS. 1E-H are simplified schematic illustrations of a system for reducing unwanted gases in indoor air including a variety of inlet mechanisms for allowing indoor air into the system.
Figure 1F:
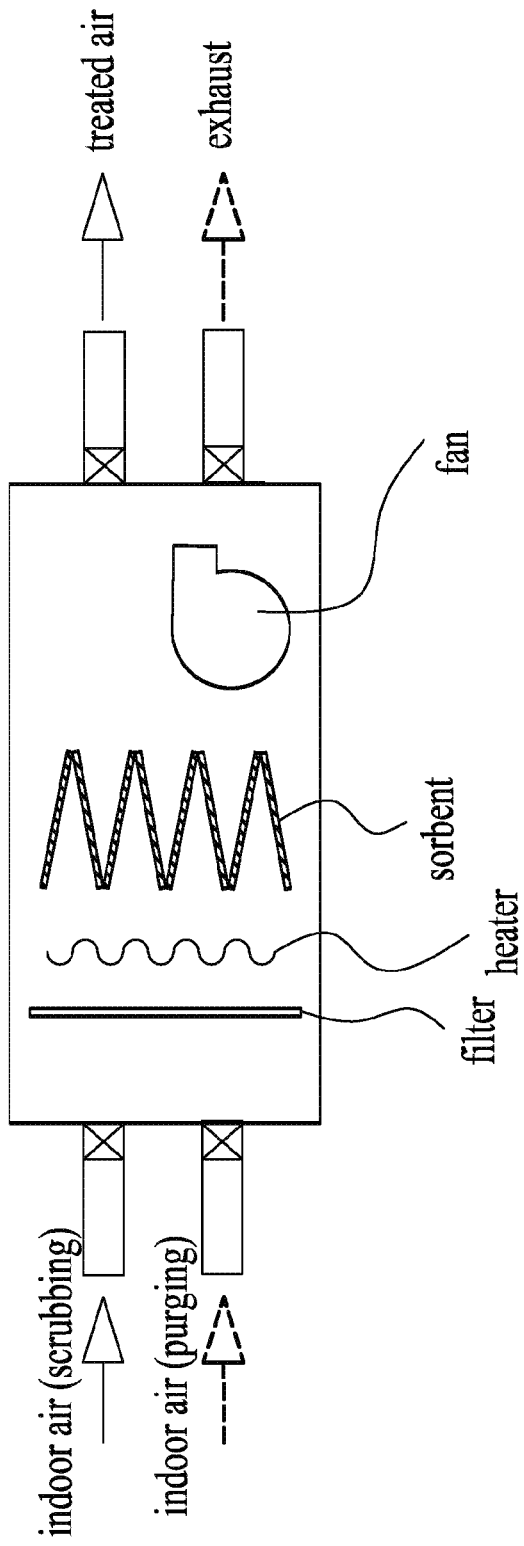
Figure 1G:
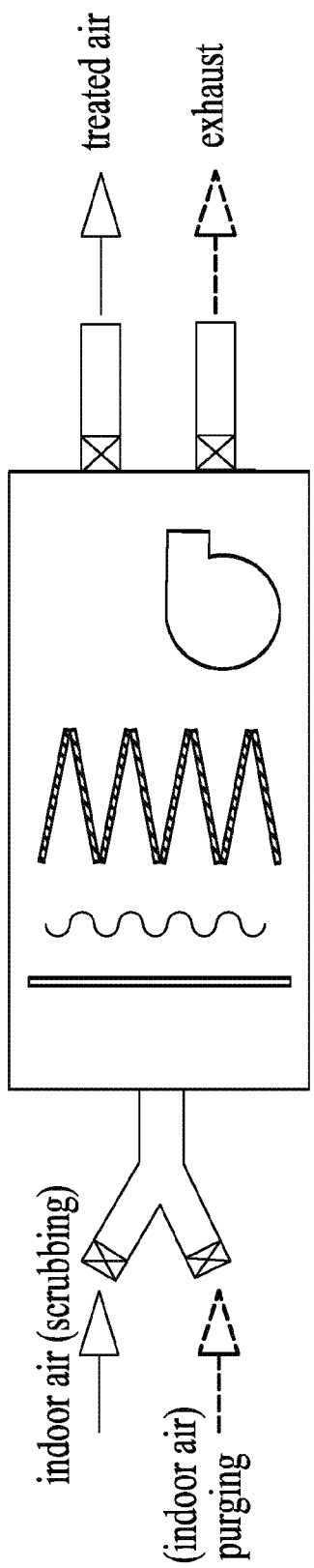
Figure 1H:
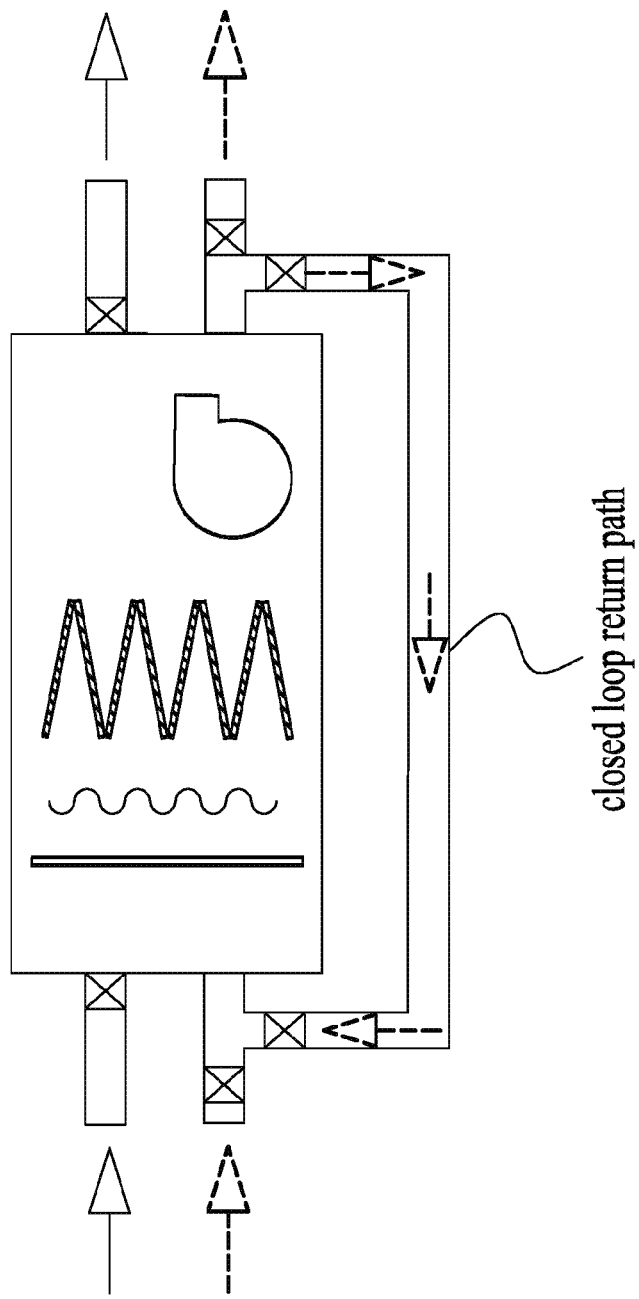

In some embodiments, with reference to FIG. 1D, the purge gas 160 comprising the purge air may be different than the indoor air 114 that is allowed into the air treatment assembly 110 via the air indoor inlet 120. For example, during the regeneration cycle of the air treatment assembly 110, the purge gas inlet 170 may be configured to allow the flow of air circulating in the enclosed environment 102 into the air treatment assembly 110 as a purge air. In some instances, the purge gas inlet 170 may be located inside the enclosed environment 102 so as to allow the inflow of such purge air into the air treatment assembly 110 that comprises a low threshold of contaminant level. An example of a low threshold comprises some fraction of the average contaminant level in the air circulating in the enclosed environment 102 as measured by the sensors 256.

In some embodiments, the purge air may be provided to the air treatment assembly 110 from air flowing through the purge gas exhaust 180. During the regeneration mode of the air treatment system, purge gas 160 may be used to remove contaminants and regenerate the adsorbent, and consequently discharged through purge gas exhaust 180. As such, the purge gas 160 exiting through the purge gas exhaust 180 may contain an elevated level of contaminants, for example, compared to the purge gas 160 entering the air treatment assembly 110. In some instances, the purge gas 160 exiting through the purge gas exhaust 180 may be redirected via a channel 194 to join the purge gas inlet 170.

In some embodiments, the controller 254 of the air treatment assembly 110 may determine whether the redirected exhaust purge gas 160 should be recycled to be used as a purge air. In some embodiments, such determinations may be made based on exhaust purge gas 160 quality measurements as performed by sensors 256a located in along the channel 194 or in proximity thereto so as to obtain the measurements. The sensors 256a may be configured to generate output data that can be transmitted to the control system or controller 254 for processing thereof upon detection of some concentration of contaminants, substances, gases, etc., in the exhaust purge gas 160 that exceeds a threshold for recycling the exhaust purge gas 160 as a purge air. In some embodiments, the controller 254 may be configured to instruct the channel 194, upon receiving such information, to not allow the exhaust purge gas 160 to be diverted as a purge air.

In some embodiments, in-situ regeneration, namely without having to move the adsorbent material out of the air treatment assembly 110, or parts of the air treatment assembly 110, can be facilitated by a combination of heat and a flow of a purge gas 160, which may be outdoor air, for example. In a non-limiting example, the outdoor air contains a $CO_2$ concentration of less than 1000 ppm. In a non-limiting example, the outdoor air contains a $CO_2$ concentration of less than 600 ppm. In a non-limiting example, the outdoor air contains a $CO_2$ concentration of less than 400 ppm.

In some embodiments, the purge gas 160 may flow during the regeneration cycle in the opposite direction of the indoor air flow during the adsorption cycle, such as from purge gas inlet 170 to the purge gas exhaust 180, such as shown in FIGS. 1A-8. Alternatively, the purge gas 160 may flow during the regeneration cycle in the same direction of the return airflow, such as from purge gas exhaust 180 to purge gas inlet 170.

Figure 2A:
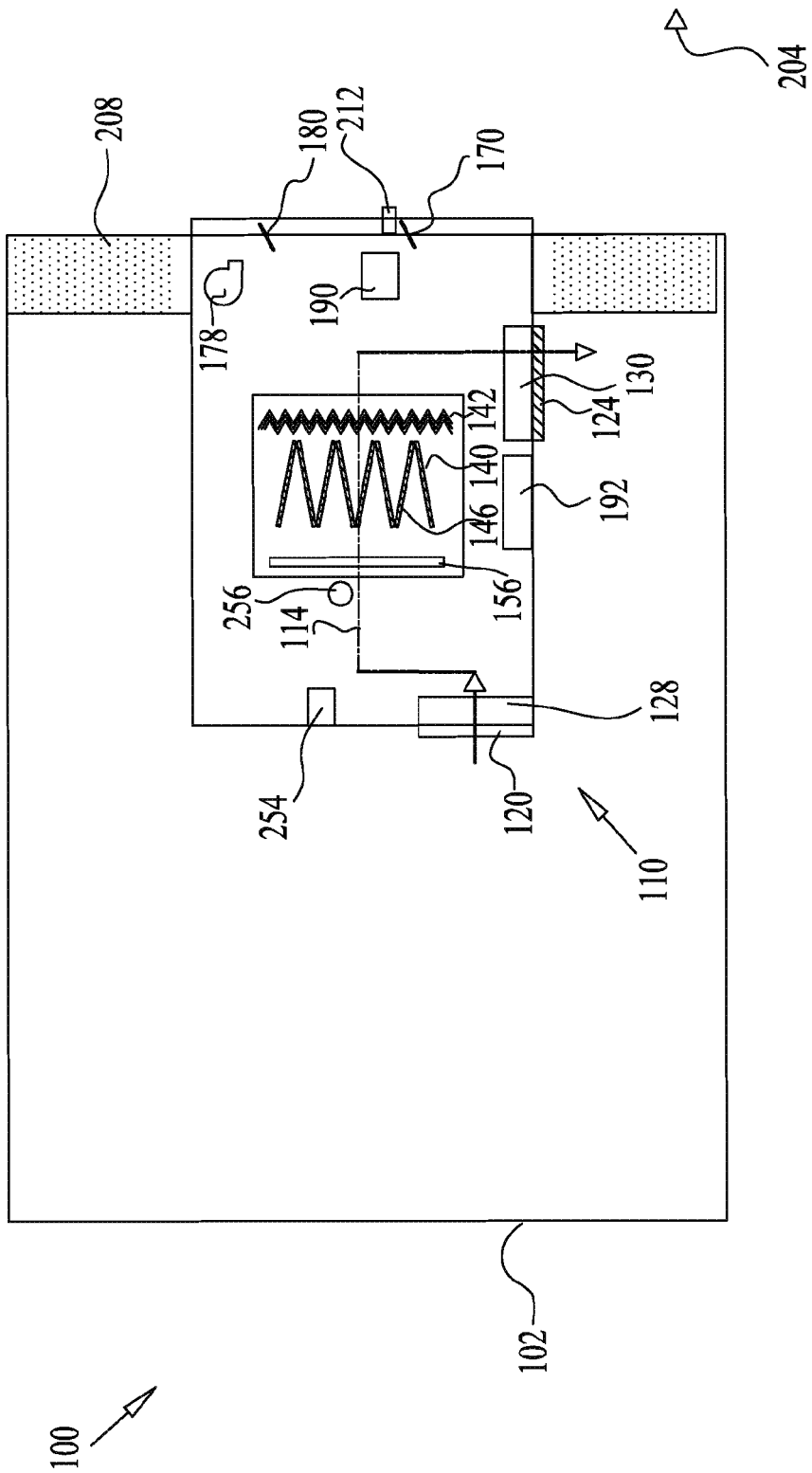
FIGS. 2A-C are simplified schematic illustrations of a system for reducing unwanted gases in indoor air at a first operational mode (FIG. 2A) and a second operational mode (FIGS. 2B and 2C) according to some embodiments of the present disclosure.
Figure 2B:
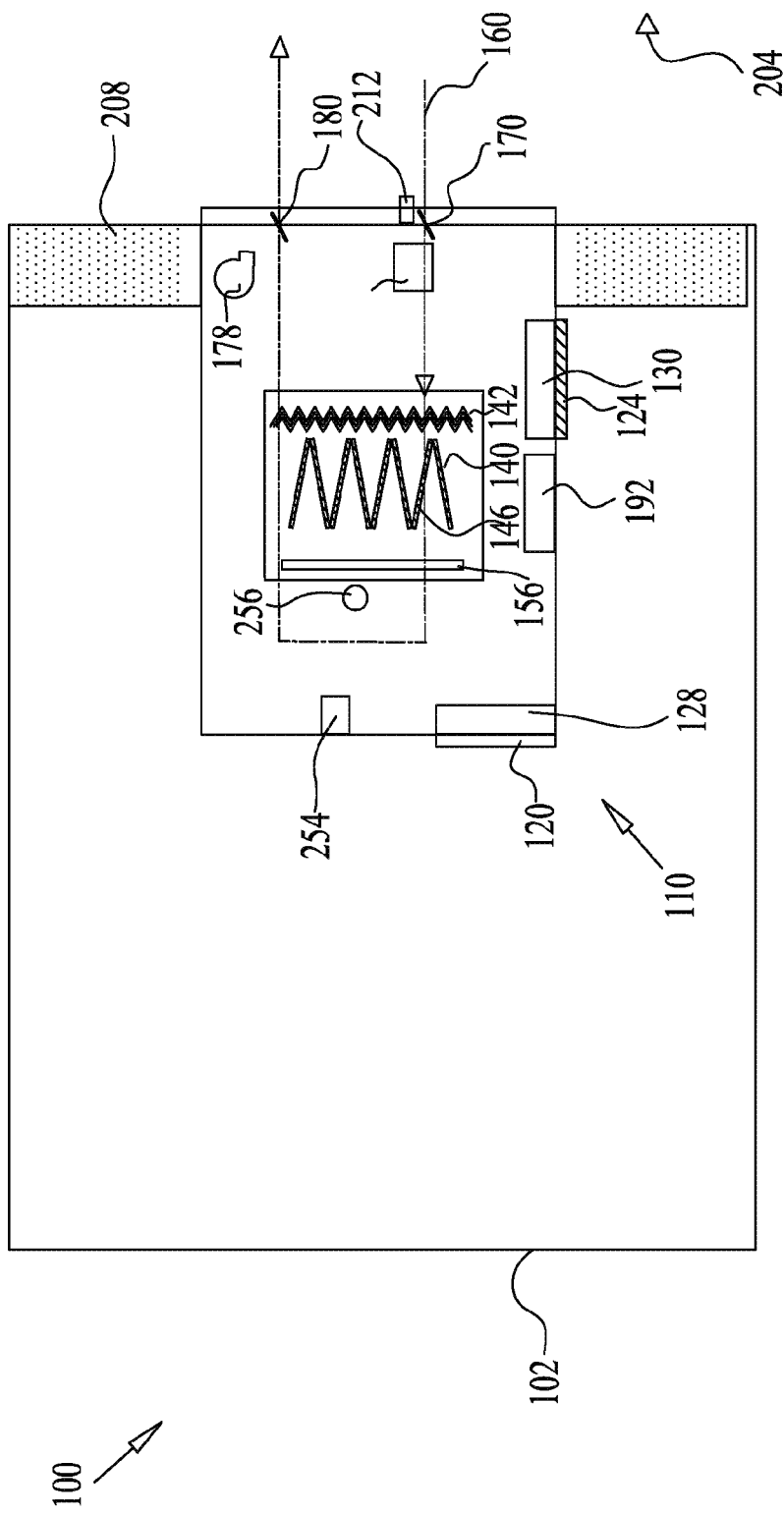
Figure 2C:
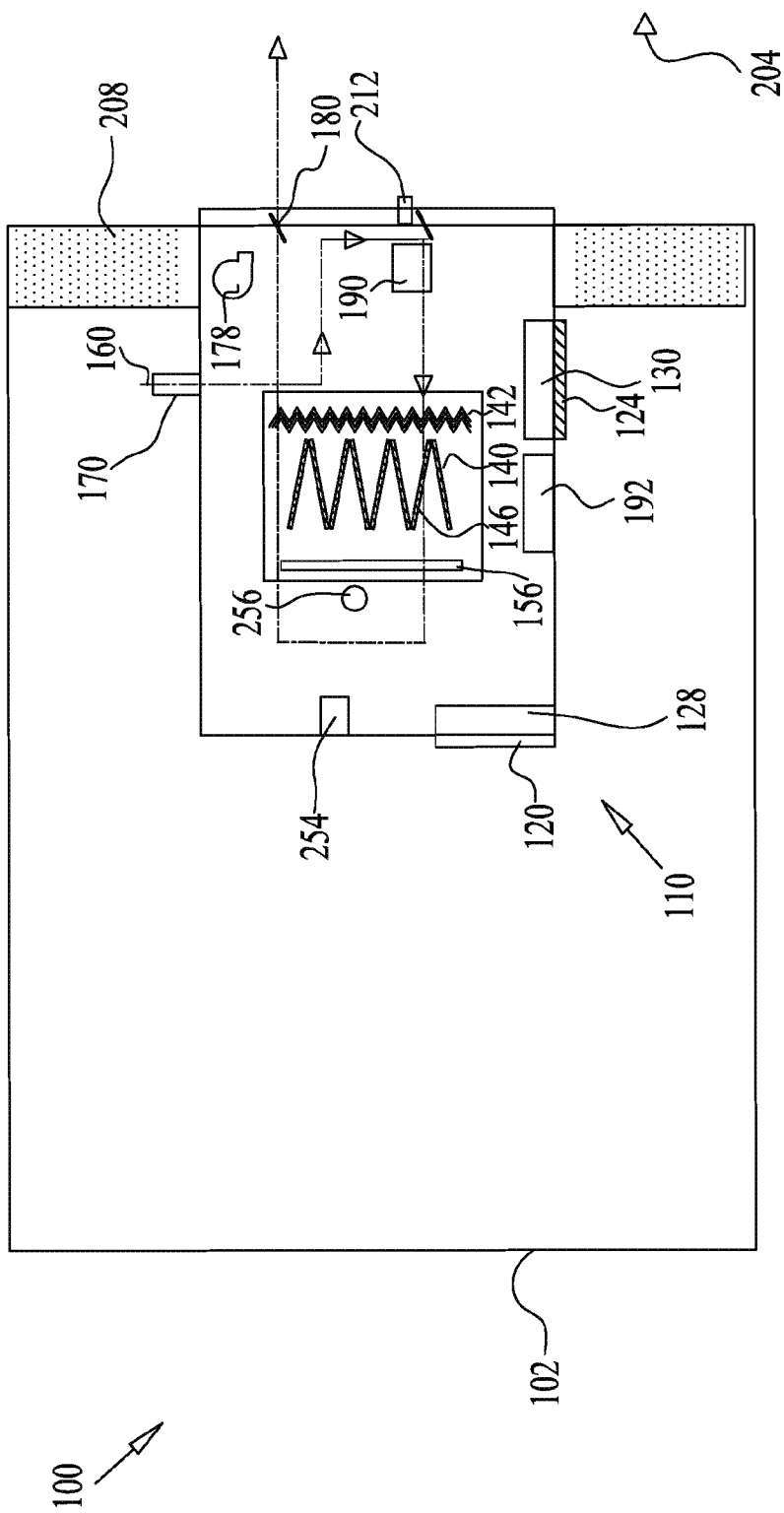

In some embodiments, purge gas inlet 170 and purge gas exhaust 180 may be formed as a conduit or duct, as shown in FIGS. 1A and 1B, or in any other suitable manner. In other embodiments, the purge gas inlet 170 and purge gas exhaust 180 may be formed as apertures allowing the purge gas 160 to flow therethrough, as shown in FIGS. 2A and 2B. In some embodiments, the purge gas inlet 170 may have at least one opening inside the enclosed environment 102 for allowing in indoor air to serve as purge air, as shown in FIG. 2C.

In some embodiments, the purge gas 160 exiting the purge gas exhaust 180 may be discharged into the ambient environment outside the enclosed environment 102. In some embodiments, the purge gas 160 may flow out of the purge gas exhaust 180 to existing exhaust ducts in the enclosed environment 102, such as an air exhaust, typically furnished in a bathroom of the enclosed environment 102 or openings such as windows. Additionally, purge gas 160 exiting the purge gas exhaust 180 may flow to a volume in the enclosed environment 102, such as a stairwell, sewerage system or smoke control system. Moreover, purge gas 160 may be directed to flow into a pressure vessel (not shown) for eventual release of the purge gas 160 therefrom.

The purge gas 160 may be heated prior to regeneration of the air treatment assembly 110 by any suitable heating element 190. The heating element 190 may comprise, for example, a coil such as an electrical coil, a radiator, a heat pump, a solar heater or an appropriately sized furnace burning water, gas or other fuel (not shown) for heating the purge gas 160. In some embodiments, the purge gas 160 may be heated within the air treatment assembly 110. In some embodiments, the purge gas 160 may be heated prior to flow into the air treatment assembly 110.

In accordance with some embodiments, the purge gas 160 may be heated to a temperature within a range of about 20-120° C. In accordance with some embodiments, the purge gas 160 may be heated to a temperature of less than 80° C. In accordance with some embodiments, the purge gas 160 may be heated to a temperature of less than 50° C. In accordance with some embodiments, the purge gas 160 may enter the air treatment assembly 110 at the ambient temperature of the ambient environment outside the enclosed environment 102.

Regeneration of the adsorbent material removes the contaminants from the adsorbent material. Therefore, the air treatment assembly 110 can be repeatedly used for removing contaminants from the enclosed environment 102 without requiring replacement of the adsorbent material. Accordingly, the air treatment assembly 110 has a significantly long operating life. In a non-limiting example, the $CO_2$ scrubbing cartridges 146 and/or VOC scrubbing cartridges 148 may operate for about a year, two years or three years, due to the regenerability thereof by the purge gas 160. In a non-limiting example, the air treatment assembly 110 may operate for 10-20 years. If necessary, the $CO_2$ scrubbing cartridges 146 and/or VOC scrubbing cartridges 148 may be replaced as will be further described.

In some embodiments after the significantly long operating life, the adsorbent materials may chemically or physically deteriorate. Accordingly, the $CO_2$ scrubbing cartridges 146 or VOC scrubbing cartridges 148 may be configured to be removable from the air treatment assembly 110. The removed scrubbing cartridges may be restored or replaced with operating scrubbing cartridges and may be returned to the air treatment assembly 110. The housing 112 may comprise access doors 192 allowing easy accessibility to any one of the $CO_2$ scrubbing cartridges 146 or VOC scrubbing cartridges 148. The access doors 192 may be placed at any suitable location within the housing 112.

The air treatment assembly 110 may be placed in any suitable location within the enclosed environment 102. In accordance with some embodiments of the present disclosure, the air treatment assembly 110 may treat the indoor air 114 independently of an air conditioning system. Accordingly, the air treatment assembly 110 may be located within the enclosed environment 102 at any convenient location wherein there is access to purge gas 160. Some exemplary locations for placement of the air treatment assembly 110 within the enclosed environment 102 are shown in FIGS. 1A-8.

As seen in FIGS. 1A and 1B, the air treatment assembly 110 may be mounted under a ceiling 200 within the enclosed environment 102 and may be affixed thereto by any suitable means.

The purge gas inlet 170 and purge gas exhaust 180 may be formed in any suitable manner for allowing the purge gas 160, such as outdoor air, indoor air, recycled exhaust purge air, to flow in to purge gas inlet 170 and out of purge gas exhaust 180. The access to outdoor air may be by any suitable means, such as by providing conduits, such as flexible conduits, in contact with a source of outdoor air in the ambient environment 204. In some embodiments, the contact with the source of outdoor air may be provided by utilizing outdoor air accesses existing in the enclosed environment 102, such as a window 206. In some embodiments, purge outdoor air access may be from a vent, or an enclosed environment pier. In some embodiments, access to indoor air may be provided by a purge gas inlet 170 that terminates with an opening within the enclosed environment 102. In some embodiments, the purge gas inlet 170 opening may be formed with a grille. In some embodiments, the flow of indoor air into the purge gas inlet 170 to serve as purge air may be controlled via purge gas inlet damper and/or a fan. In some embodiments, the purge gas exhaust 180 may expel the purge gas 160 (i.e. the purge air) from the air treatment assembly 110, via window 206 as shown in FIG. 1B, and thereout into the ambient environment 204. In some embodiments, the purge gas 160 may be expelled from the air treatment assembly 110 to a bathroom in the enclosed environment, or any other location and thereout into the ambient environment 204. In some embodiments, purge gas 160 flowing through purge gas exhaust 180 may be recycled to be used as a purge air via the channel 194 in a manner described above, for example.

In FIGS. 2A and 2B the air treatment assembly 110 is shown mounted to a wall 208 of the enclosed environment 102, wherein a portion of the air treatment assembly 110 may be placed in the enclosed environment 102 and a portion may protrude into the ambient environment 204. In some embodiments the wall 208 may be an exterior wall where one side of the wall is in the enclosed environment 102 and the other side of the wall is in the ambient environment 204. As seen in FIG. 2A, during the adsorption cycle, the indoor air 114 may enter the air treatment assembly 110 via the indoor air inlet 120 and damper 128, and may flow through filter 156, $CO_2$ sorbent section 140 and/or the VOC sorbent section 142 and out the air treatment assembly 110, via indoor air outlet 124 and damper 130 back into the enclosed environment 102.

As seen in FIG. 2B, during the regeneration cycle, the regenerating outdoor air of the purge gas 160 may enter the air treatment assembly 110 from the ambient environment 204, via purge gas inlet 170, and may be heated by the heating element 190. In some embodiments, the regenerating air of the purge gas 160 may enter the air treatment assembly 110 from the enclosed environment 102, the purge gas exhaust 180, etc., via purge gas inlet 170 or channel 194, and may be heated by the heating element 190. The purge gas 160 may flow through VOC sorbent section 142, the $CO_2$ sorbent section 140, and/or filter 156 for contaminant removal therefrom. The purge gas 160 exits the air treatment assembly 110, via purge gas exhaust 180, to the ambient environment 204. A damper set 212 may be provided, similar to dampers 176 and 182 in FIG. 1B.

As seen in FIGS. 2A and 2B, the air treatment assembly 110 may be mounted to wall 208 within the enclosed environment 102 and may be affixed thereto by any suitable means.

The purge gas inlet 170 and purge gas exhaust 180 may be formed in any suitable manner for allowing the purge gas, such as outdoor air, indoor air, recycled exhaust purge air, etc., to flow into purge gas inlet 170 and out of purge gas exhaust 180. As seen in FIGS. 2A and 2B, the air treatment assembly 110 is partially placed in the ambient environment 204 and therefore there is easy access to regenerating outdoor air which can readily enter the purge gas inlet 170 and exit the purge gas exhaust 180. In some embodiments, the regenerating air may be obtained from indoor air via the indoor air inlet 120, recycled from the purge gas exhaust 180, and/or indoor purge gas inlet 170.

Figure 3A:
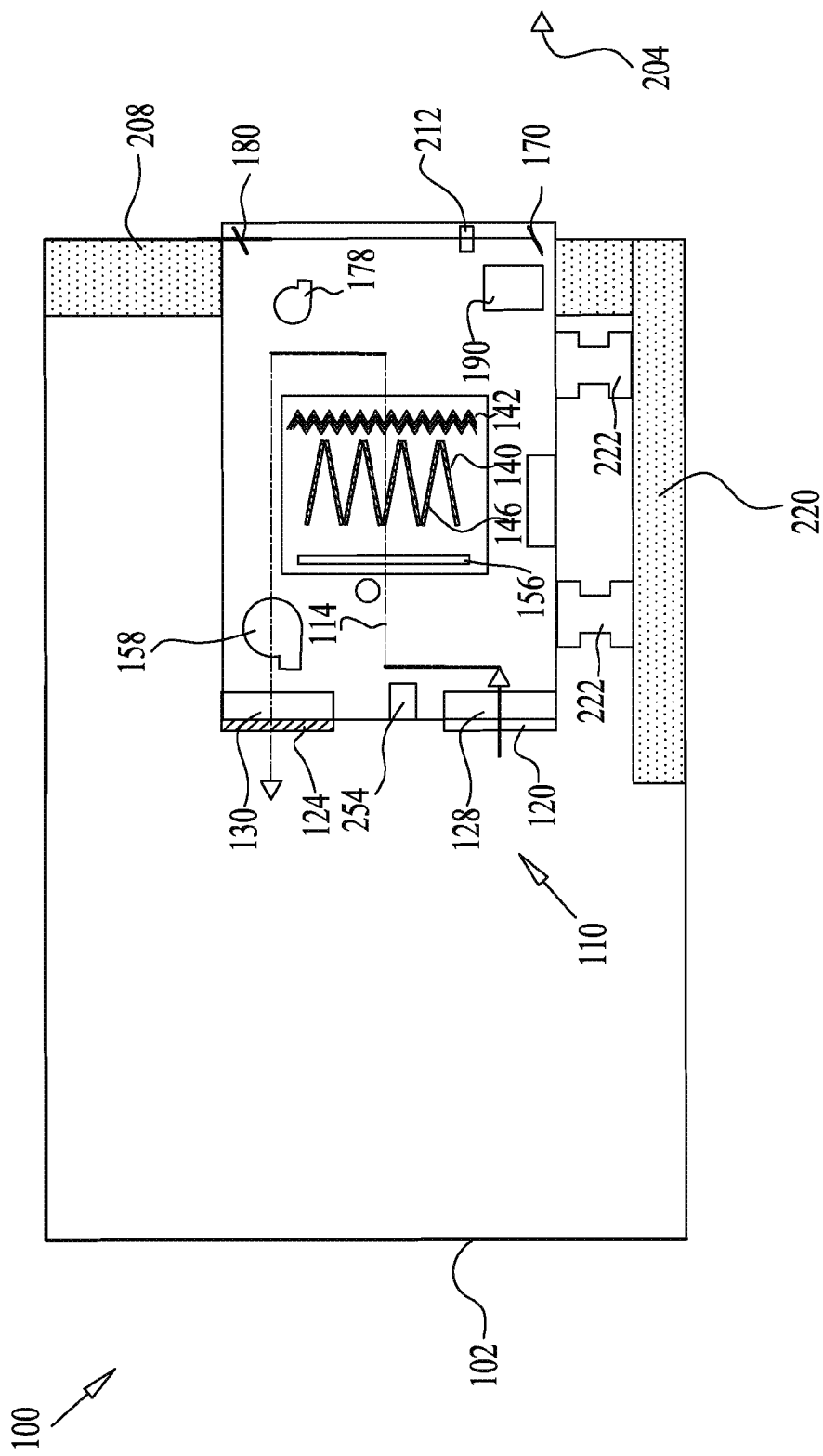
FIGS. 3A-C are simplified schematic illustrations of a system for reducing unwanted gases in indoor air at a first operational mode (FIG. 3A) and a second operational mode (FIGS. 3B and 3C) according to some embodiments of the present disclosure.
Figure 3B:
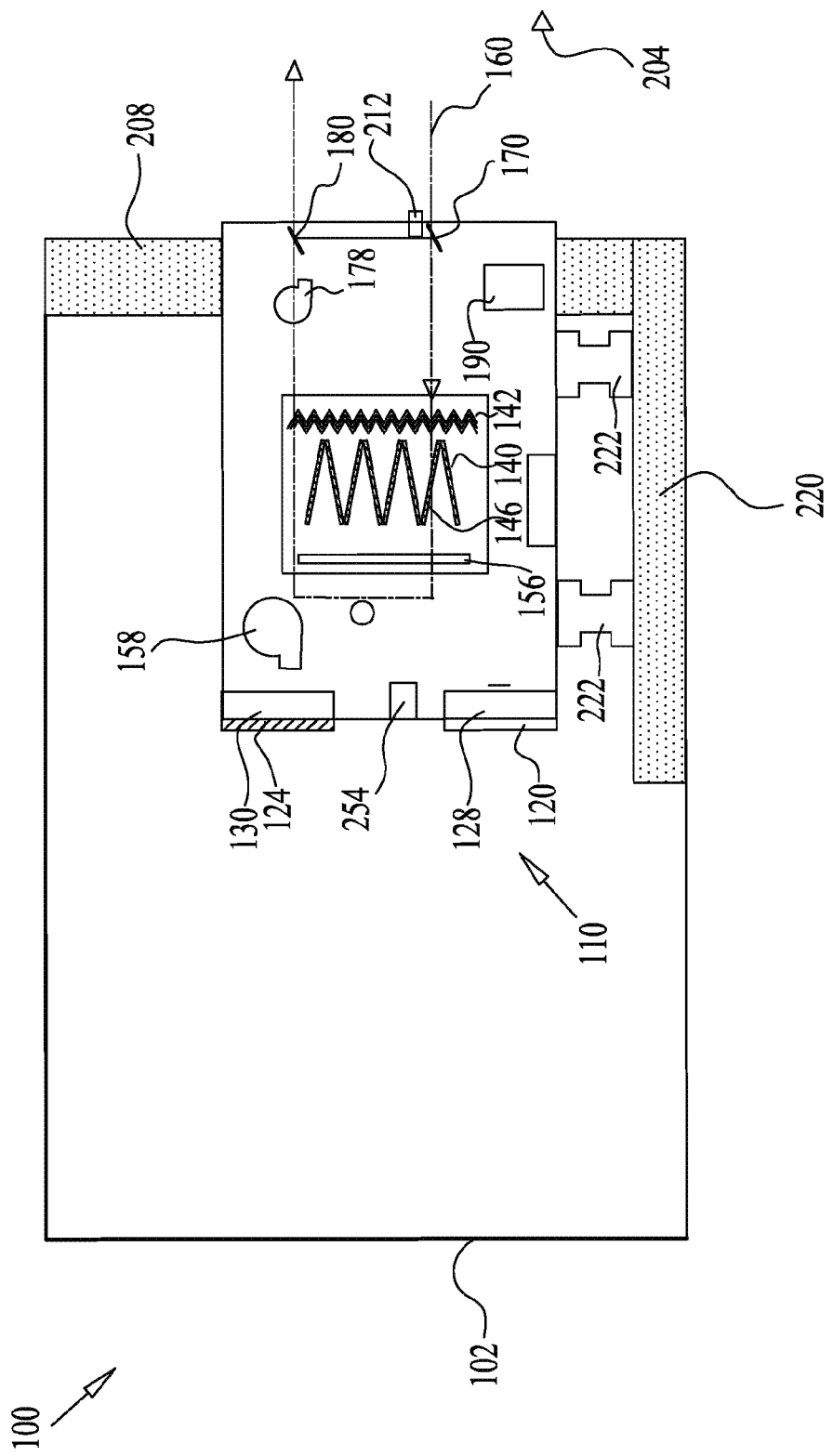

In FIGS. 3A and 3B the air treatment assembly 110 is shown mounted in proximity to a floor 220 or on the floor 220 of the enclosed environment 102, wherein the air treatment assembly 110 is placed in the enclosed environment 102. As seen in FIG. 3A, during the adsorption cycle, the indoor air 114 may enter the air treatment assembly 110 via indoor air inlet 120 and damper 128 and may flow through filter 156, $CO_2$ sorbent section 140 and/or the VOC sorbent section 142 and out the air treatment assembly 110 via indoor air outlet 124 back into the enclosed environment 102.

Figure 3C:
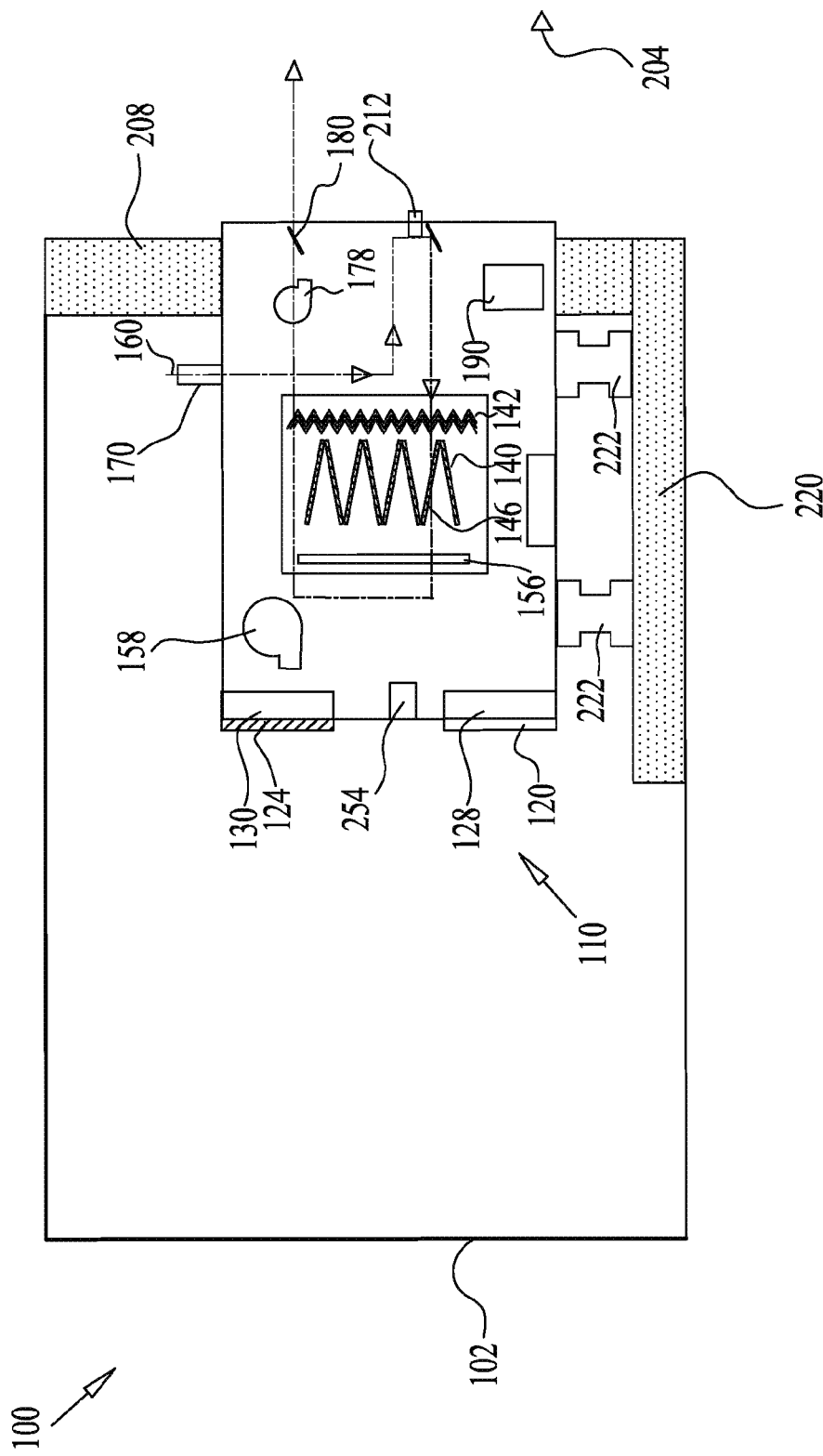

As seen in FIG. 3B, during the regeneration cycle, the outdoor air of the purge gas 160 enters the air treatment assembly 110 from the ambient 204, via purge gas inlet 170 and may be heated by heating element 190. In some embodiments, the indoor purge gas 160 may enter the air treatment assembly 110 from the enclosed environment 102, via the indoor air inlet 120, the purge gas indoor inlet 170a, etc., and may be heated by heating element 190, as shown in FIG. 3C, for example. A portion of the air treatment assembly 110 may protrude from wall 208 or any other location allowing outdoor air to flow therein. The purge gas 160 may flow through VOC sorbent section 142, the $CO_2$ sorbent section 140, and/or through filter 156 for contaminant removal therefrom. The purge gas 160 exits the air treatment assembly 110, via the purge gas exhaust 180 and damper set 212 to the ambient environment 204.

As seen in FIGS. 3A and 3B, the air treatment assembly 110 may be mounted in proximity to a floor 220 or on the floor 220 within the enclosed environment 102 and may be affixed to the floor 220 by any suitable means, such as via an attachment means 222 attaching the air treatment assembly 110 to the floor 220.

In some embodiments, the air treatment assembly 110 may be placed on the floor 220 distally from wall 208 and access to regenerating outdoor air 160 may be achieved in any suitable manner, such as via conduits placed at a window, for example.

Figure 4A:
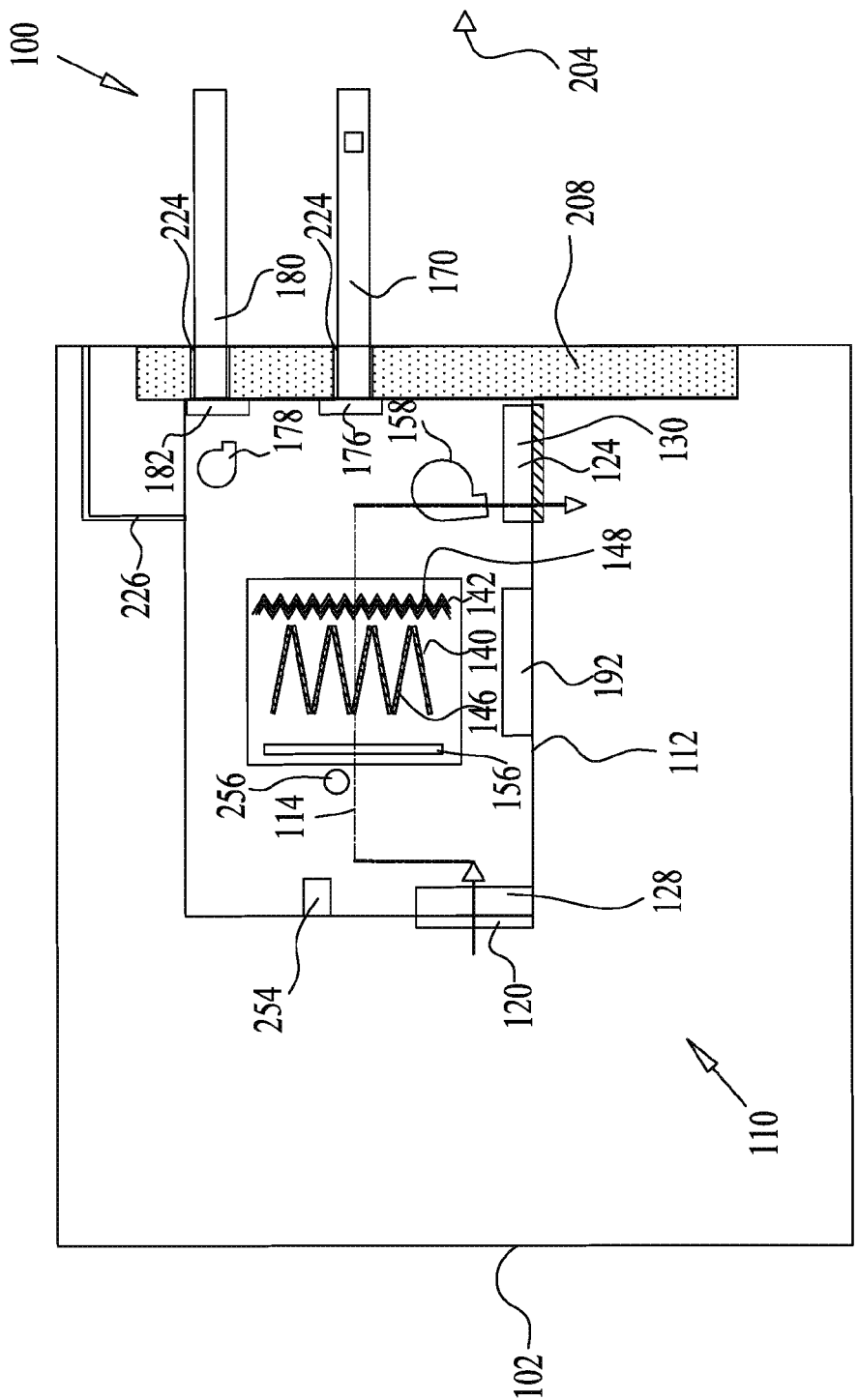
FIGS. 4A-C are simplified schematic illustrations of a system for reducing unwanted gases in indoor air at a first operational mode (FIG. 4A) and a second operational mode (FIGS. 4B and C) according to some embodiments of the present disclosure.
Figure 4B:
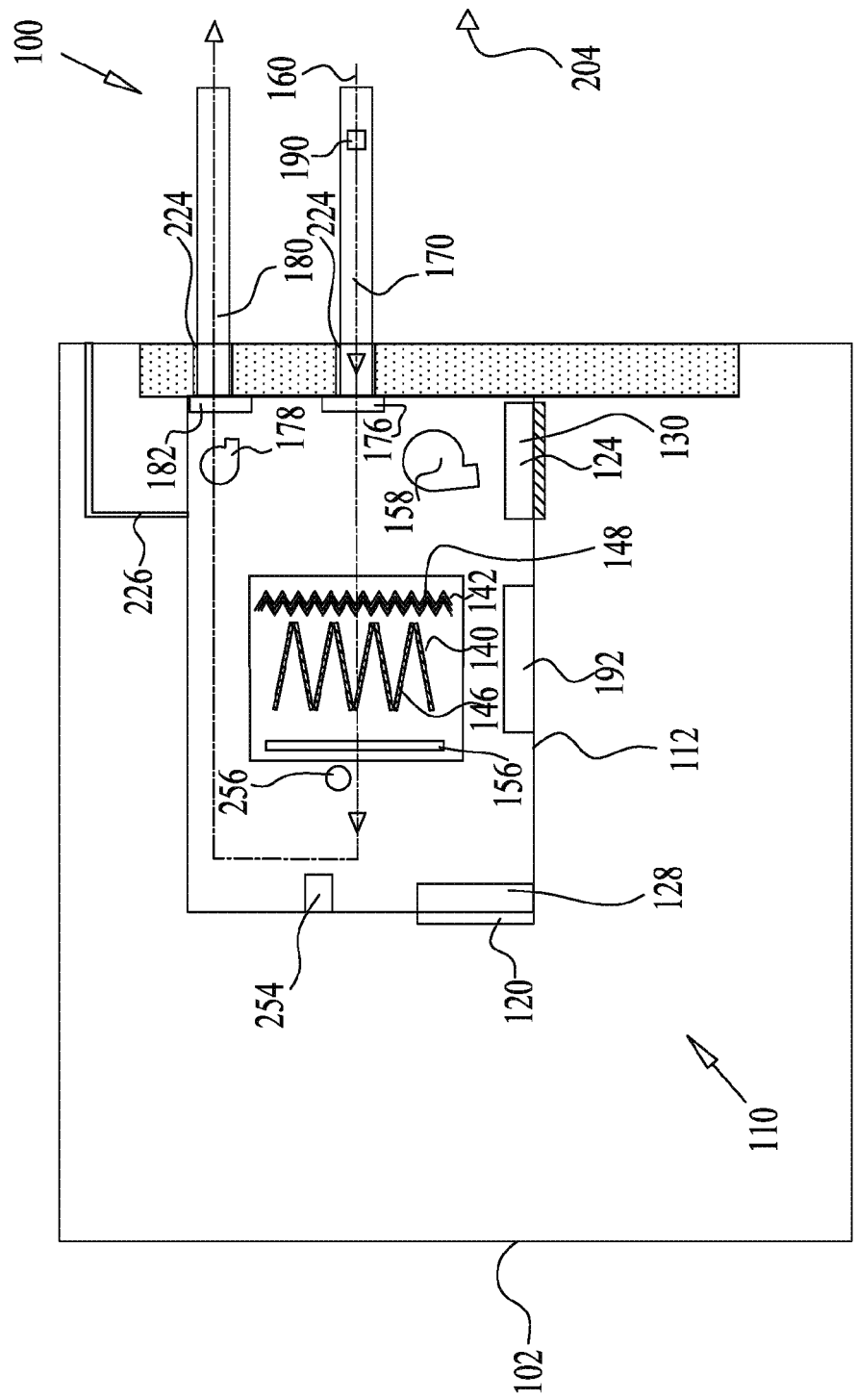

In FIGS. 4A and 4B the air treatment assembly 110 is shown mounted to the wall 208 of the enclosed environment 102 and may be at a distance from the floor 220 (FIG. 3A) or ceiling 200 (FIG. 1A). As seen in FIG. 4A, during the adsorption cycle, the indoor air 114 may enter the air treatment assembly 110 via the indoor air inlet 120 and damper 128 and may flow through filter 156, $CO_2$ sorbent section 140 and/or the VOC sorbent section 142 and out the air treatment assembly 110, via indoor air outlet 124 and damper 130 back into the enclosed environment 102.

Figure 4C:
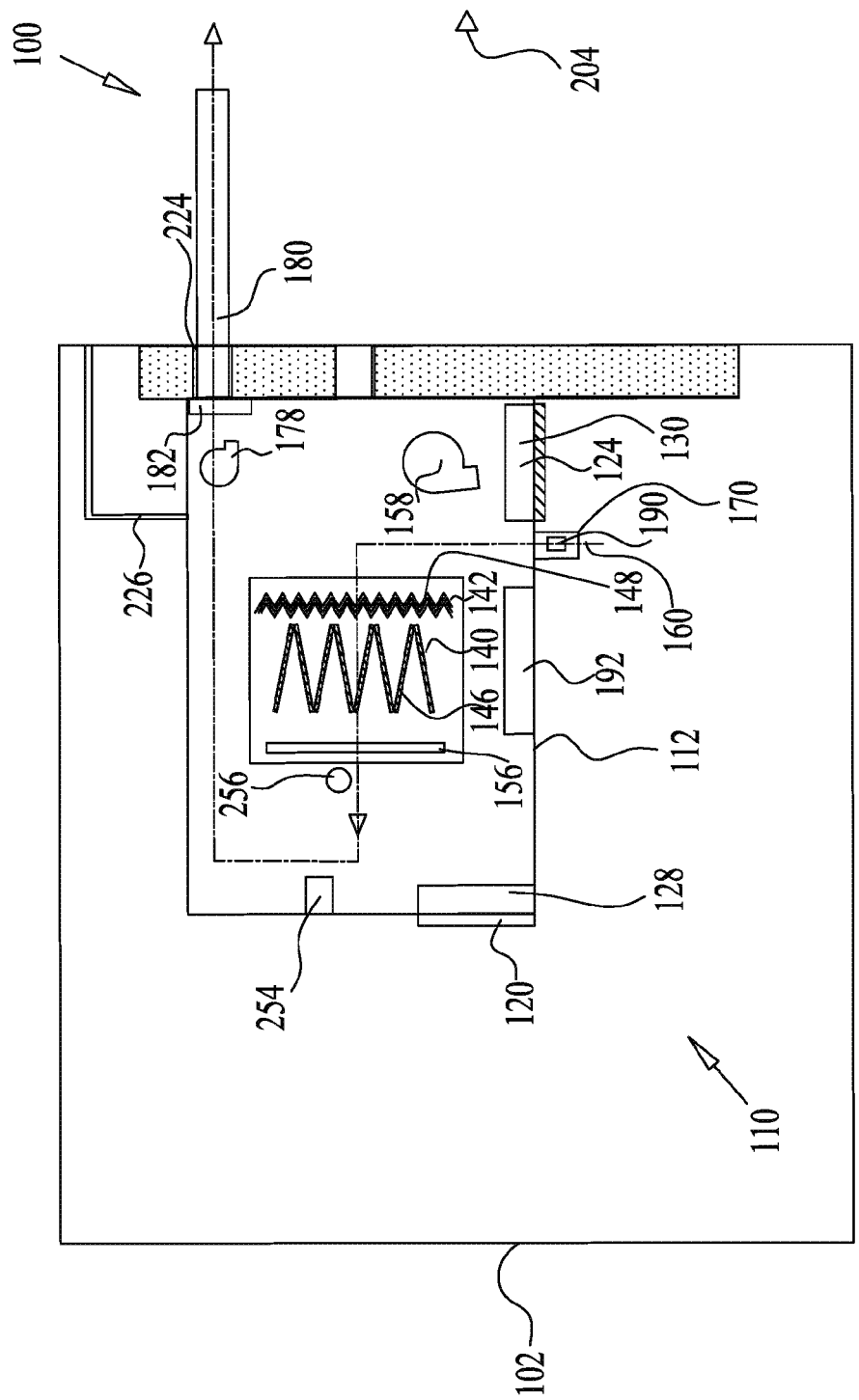

As seen in FIG. 4B, during the regeneration cycle, the outdoor air of the purge gas 160 enters the air treatment assembly 110 from the ambient environment 204 via purge gas inlet 170 and damper 176 and may be heated by heating element 190, placed within purge gas inlet 170. In some embodiments, the purge gas 160 enters the air treatment assembly 110 from the enclosed environment 102, the purge gas exhaust 180, etc., via purge gas inlet 170 or channel 194 and damper 176 and may be heated by heating element 190, placed within purge gas inlet 170, as shown in FIG. 4C, for example. The purge gas 160 may flow through VOC sorbent section 142, the $CO_2$ sorbent section 140, and/or filter 156 for contaminant removal therefrom. The purge gas 160 may exit the air treatment assembly 110, via the purge gas exhaust 180 and damper 182 to the ambient environment 204.

As seen in FIGS. 4A and 4B, the air treatment assembly 110 may be mounted to wall 208 at any location thereon within the enclosed environment 102 and may be affixed thereto by any suitable means, such as via an attachment means 226 attaching the air treatment assembly 110 to the wall 208.

The purge gas inlet 170 and purge gas exhaust 180 may be formed in any suitable manner for allowing the purge gas, such as outdoor air, indoor air, recycled exhaust purge air, etc., to flow into purge gas inlet 170 and out of purge gas exhaust 180. As seen in FIGS. 4A and 4B, wall 208 may be formed with bores 224 for inserting the purge gas inlet 170 and purge gas exhaust 180 therethrough for allowing a portion of the purge gas inlet 170 and/or purge gas exhaust 180 easy access to regenerating outdoor air. In some embodiments, the regenerating air may be obtained from indoor air via the indoor air inlet 120, recycled from the purge gas exhaust 180, and/or indoor purge gas inlet 170.

Figure 5A:
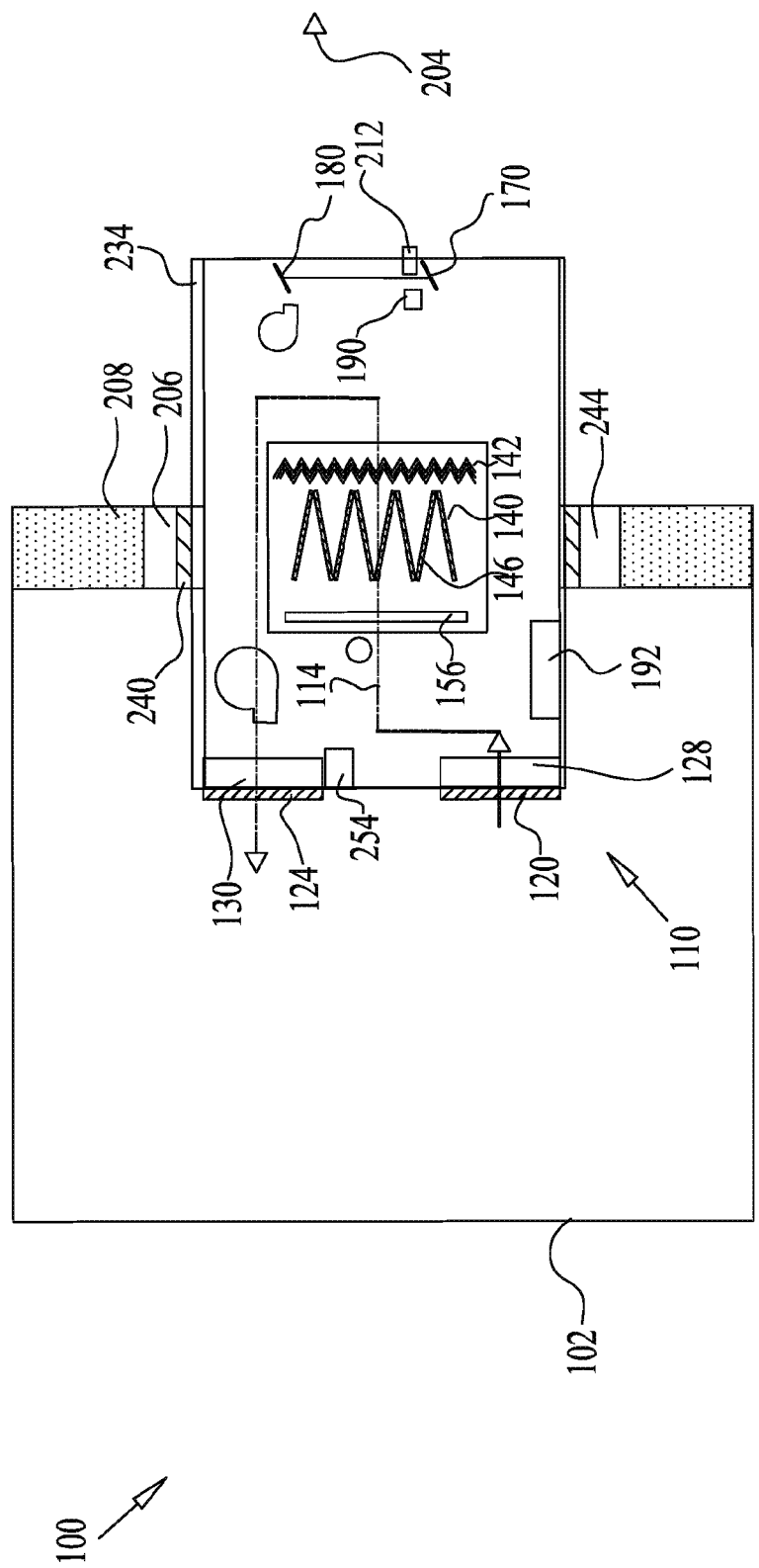
FIGS. 5A-C are simplified schematic illustrations of a system for reducing unwanted gases in indoor air at a first operational mode (FIG. 5A) and a second operational mode (FIGS. 5B and C) according to some embodiments of the present disclosure.
Figure 5B:
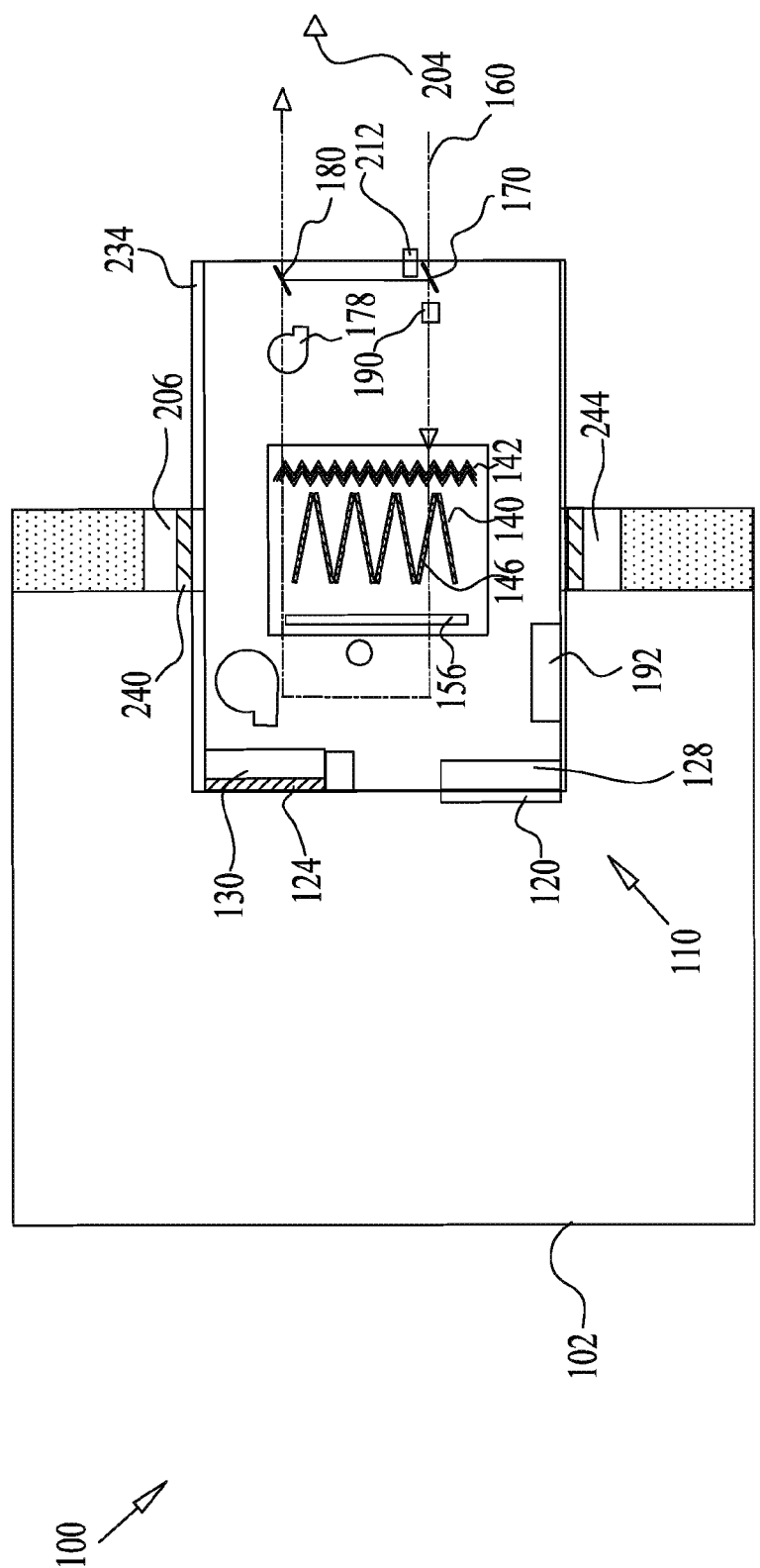

In FIGS. 5A and 5B the air treatment assembly 110 is shown mounted in window 206 of the enclosed environment 102, wherein a portion of the air treatment assembly 110 is placed in the enclosed environment 102 and a portion is placed in the ambient environment 204. As seen in FIG. 5A, during the adsorption cycle, the indoor air 114 may enter the air treatment assembly 110, via the indoor air inlet 120 and damper 128, and may flow through filter 156, $CO_2$ sorbent section 140 and/or the VOC sorbent section 142 and out the air treatment assembly 110, via indoor air outlet 124 and damper 130, back into the enclosed environment 102.

Figure 5C:
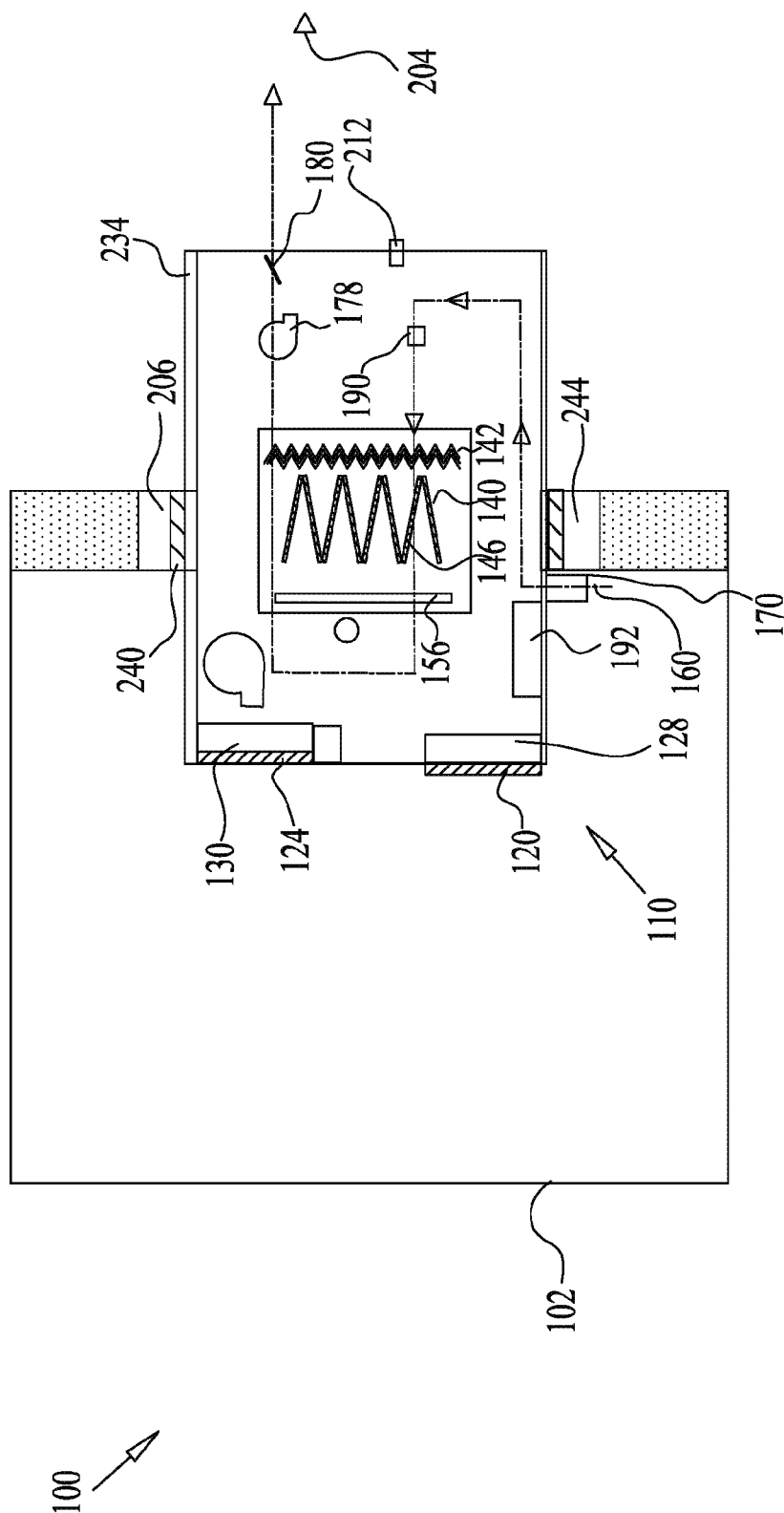

As seen in FIG. 5B, during the regeneration cycle, the outdoor air of the purge gas 160 enters the air treatment assembly 110 from the ambient 204, via purge gas inlet 170 and may be heated by the heating element 190. In some embodiments, the purge gas 160 enters the air treatment assembly 110 from the enclosed environment 102, the purge gas exhaust 180, etc., via purge gas inlet 170 or channel 194, and may be heated by the heating element 190, as shown in FIG. 5C, for example. The purge gas 160 may flow through VOC sorbent section 142, the $CO_2$ sorbent section 140, and/or filter 156 for contaminant removal therefrom. The purge gas 160 may exit the air treatment assembly 110, via purge gas exhaust 180 and damper set 212 to the ambient environment 204.

The air treatment assembly 110 may be inserted within a casing 234. In some embodiments the casing 234 may be affixed to the window 230 and the air treatment assembly 110 may be removably inserted within the casing 234. Weather sealing strips 240 may be provided to seal the enclosed environment 102 from the ambient environment 204.

As seen in FIGS. 5A and 5B, the air treatment assembly 110 may be placed within window 206 and may be affixed thereto by any suitable means, such as via attachment means or by placing the air treatment assembly 110 on the window sill 244. In this embodiment the air treatment assembly 110 may be used to treat the indoor air 114 without altering any structural component of the enclosed environment 102. Accordingly, the air treatment assembly 110 may be placed by any laymen in the enclosed environment 102 without requiring any mechanical attachments or minimal mechanical attachments which are easily installable.

The purge gas inlet 170 and/or purge gas exhaust 180 may be formed in any suitable manner for allowing the purge gas 160, such as outdoor air, indoor air, recycled exhaust purge air, etc., to flow into purge gas inlet 170 and out of purge gas exhaust 180. As seen in FIGS. 5A and 5B, the air treatment assembly 110 is partially placed in the ambient environment 204 and therefore there is easy access to regenerating outdoor air, which can readily enter the purge gas inlet 170 and exit the purge gas exhaust 180. In addition, the purge gas inlet 170 or channel 194 can allow the purge gas 160 to enter the air treatment assembly 110 from the enclosed environment 102, and exit via the purge gas exhaust 180.

Figure 6:
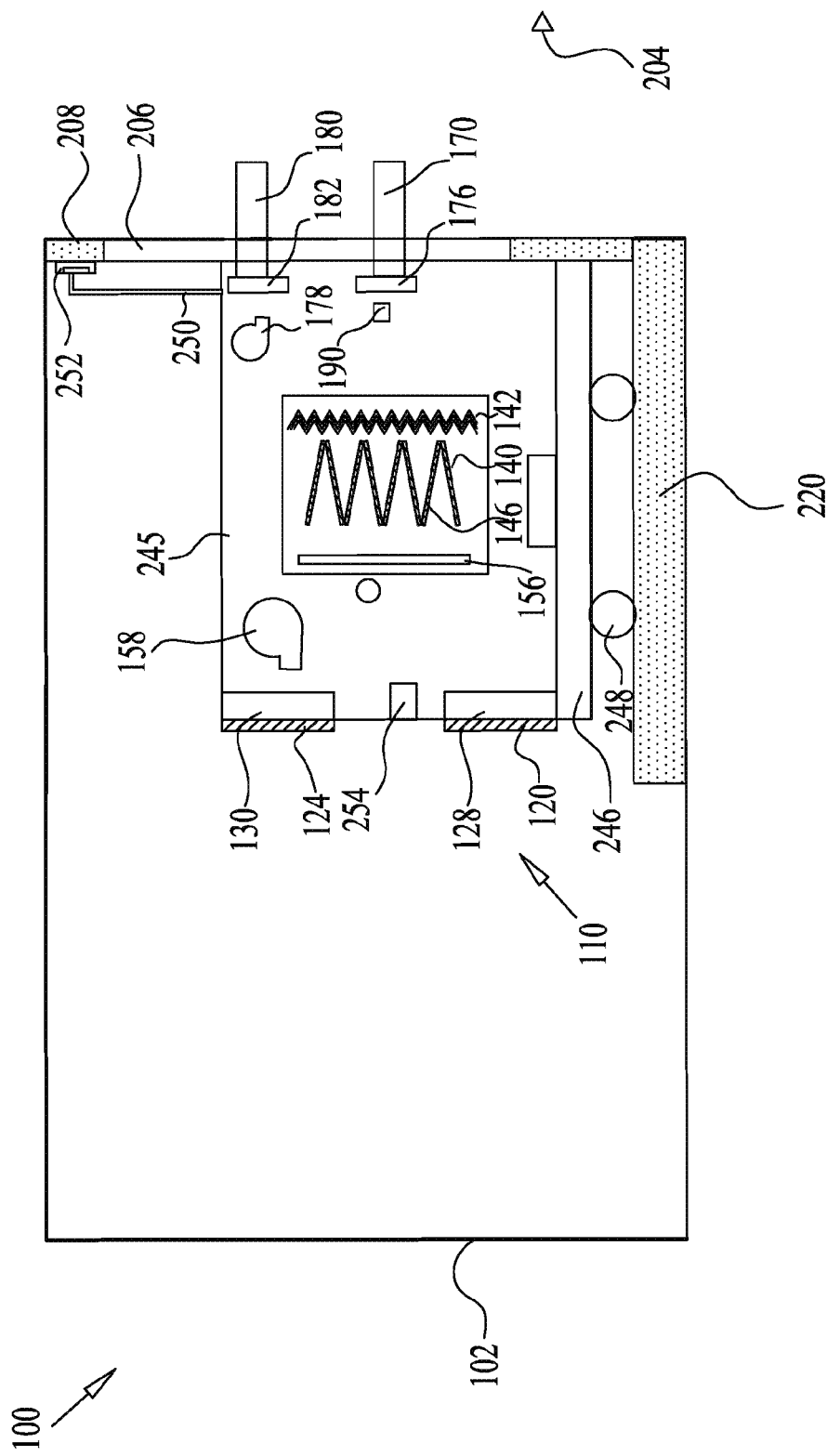
FIG. 6 is a simplified schematic illustration of a portable system for reducing unwanted gases in indoor air according to some embodiments of the present disclosure.

In some embodiments, the air treatment assembly 110 may be portable to facilitate changing its location with minimal installation work. Portability can be facilitated by any number of means. In some embodiments the air treatment assembly 110 may be configured as a portable unit with wheels or casters to roll easily over floors or surfaces and facilitate mobility. For example, as shown in FIG. 6, the air treatment assembly 110 may be configured as portable unit 245 placed on a portable base 246 with wheels 248. In some embodiments, the air treatment assembly 110 may be configured with an electric cord and plug or any other electrical connections 250 suitable for electrical communication with indoor electrical wall sockets 252. In some embodiments, the purge gas inlet 170 and/or purge gas exhaust 180 may be formed as flexible or collapsible conduits which may be extended towards a window, a plenum or any suitable exhaust area for exhausting the purge gas 160 exiting the air treatment assembly 110. The air treatment assembly 110 of FIG. 6 may operate as describe in any one of the embodiments of FIG. 1A-5C.

Thus it is seen that according to some embodiments, the air treatment assembly 110 may be configured to be portable and configured with simple electrical connections adapted to easily connect to any standard electrical sockets and may be also configured for repeated use due to the regeneration of the adsorbent materials with outdoor air. The portability of the air treatment assembly 110 allows its use for a short duration or temporarily, (e.g. an evening, a few days, weeks or months) such as in enclosed environments 102 used for events or in venues. Additionally, the portability of the air treatment assembly 110 allows easy transfer of the air treatment assembly 110 from one enclosed space to another within the enclosed environment 102 or from one enclosed environment 102 to another enclosed environment 102.

Thus it is seen that in some embodiments, the air treatment assembly 110 may be configured to be easily installable in any enclosed environment 102 and configured with simple electrical connections adapted to easily connect to any standard electrical sockets and may be also configured for repeated use due to the regeneration of the adsorbent materials with outdoor air and/or indoor air.

In some embodiments, the air treatment assembly 110 may be installed in enclosed environments 102 in addition to an existing air management system within the enclosed environment 102, yet independently from the air management system without any connection to the air management system.

In some embodiments, the air treatment assembly 110 may be configured to be installed in relatively small areas, such as classrooms of small offices, homes and buildings, for example, which are not large enough for large scale installations of air-conditioning systems and the ductworks which air-conditioning systems typically comprise.

Figure 7:
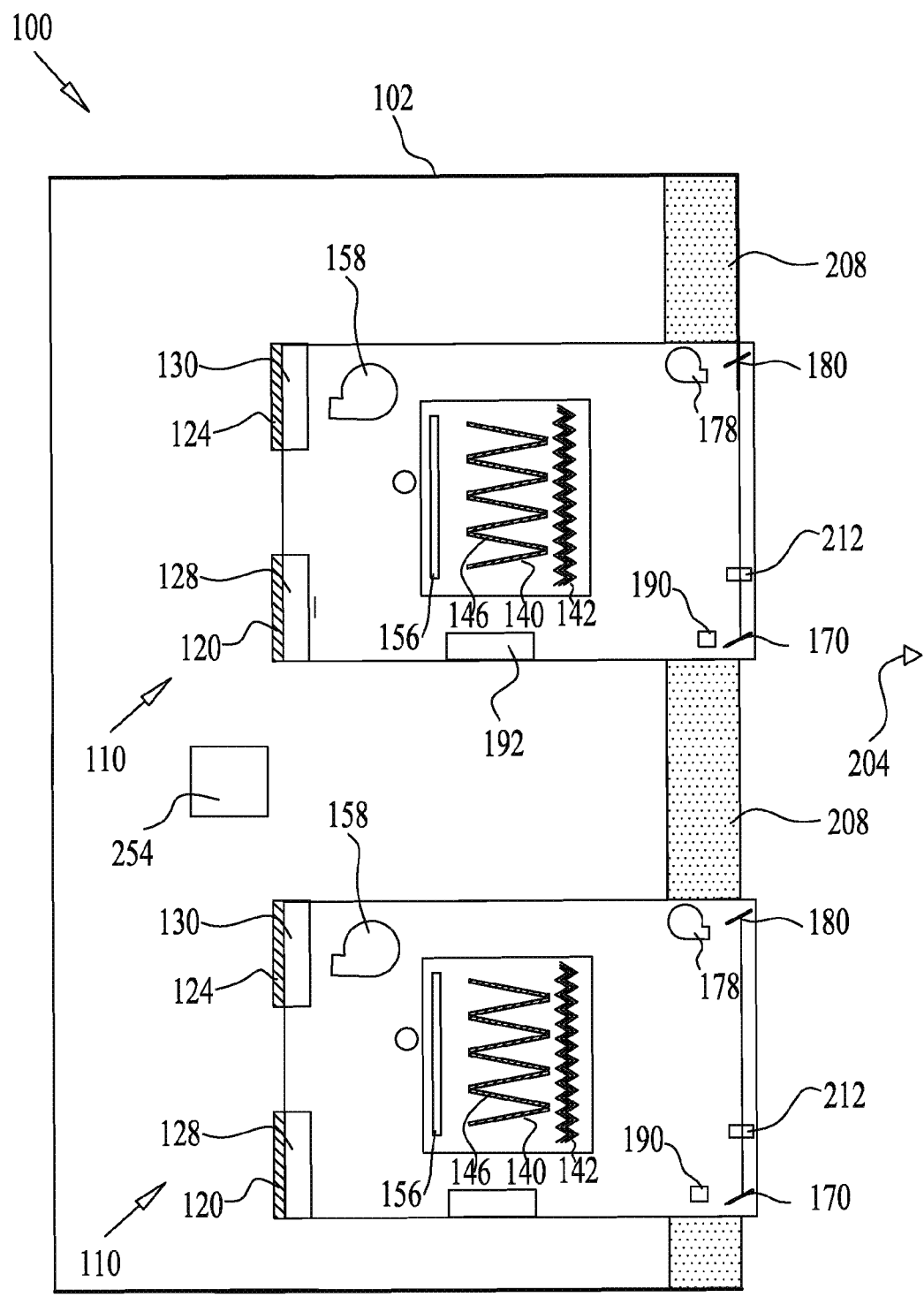
FIG. 7 is a simplified schematic illustration of a system for reducing unwanted gases in indoor air including a plurality of air treatment assemblies according to some embodiments of the present disclosure.

In some embodiments, the air treatment assembly 110 may be configured to be modular such that more than one air treatment assembly 110 may be inserted in the enclosed environment 102. The number of air treatment assemblies 110 may be determined according to the contamination level in the indoor air 114. In some embodiments, a plurality of air treatment assemblies 110 may be provided, as shown in FIG. 7, within the enclosed environment 102 and their operation may be selected according to the contamination level. For example, when the contamination level is high, all air treatment assemblies 110 may be operated and when the contamination level is lower, some of the air treatment assemblies 110 may discontinue their operation. A controller 254 may be provided to control the operation of the plurality of air treatment assemblies 110.

Figure 8:
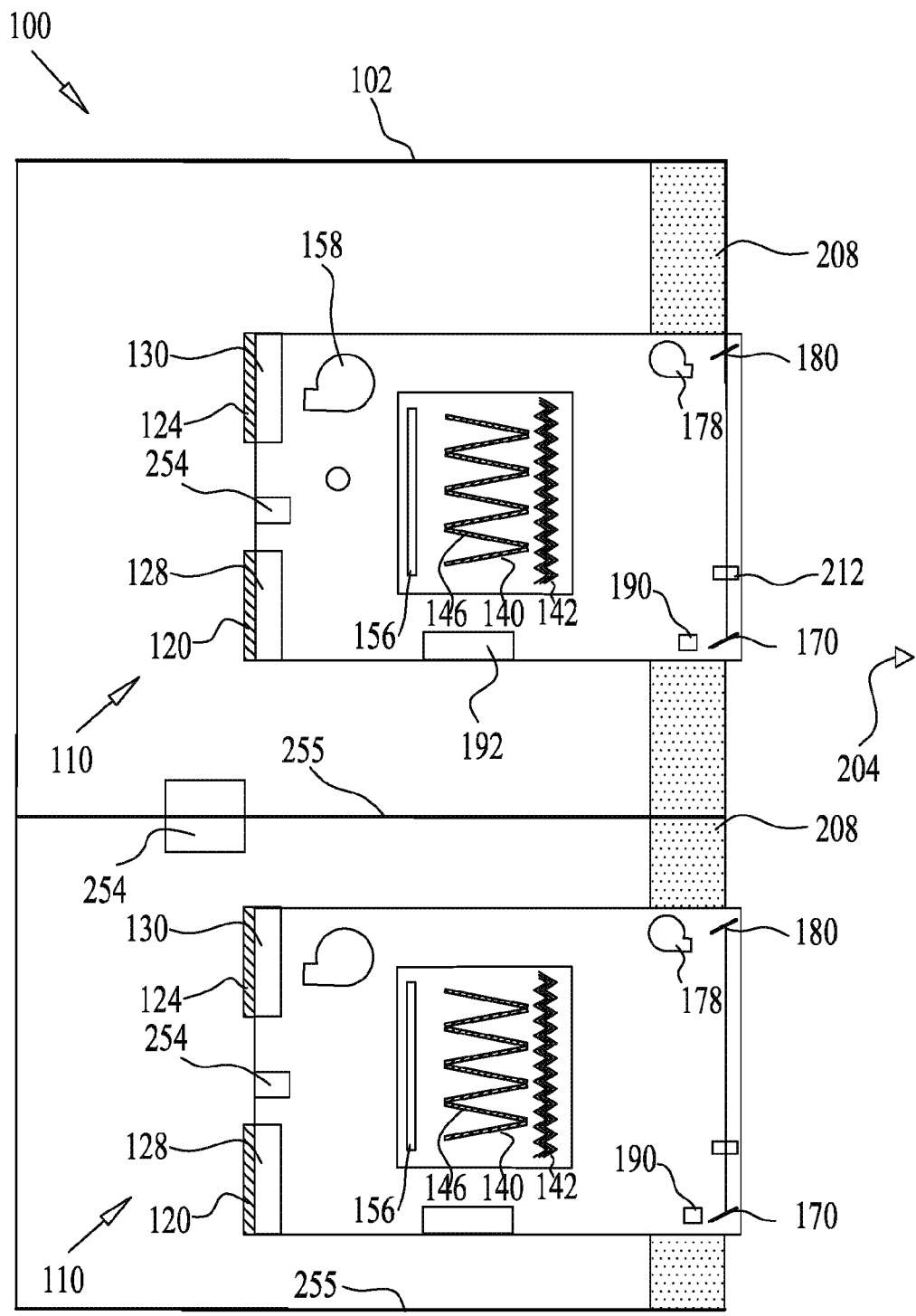
FIG. 8 is a simplified schematic illustration of a system for reducing unwanted gases in indoor air including a plurality of air treatment assemblies for a plurality of indoor spaces, respectively, according to some embodiments of the present disclosure.

In some embodiments, controller 254 may be a central controller configured to control the operation of a plurality of air treatment assemblies 110, as shown in FIGS. 7 and 8. In some embodiments, controller 254 may be configured to control a single air treatment assembly 110, as shown in FIGS. 1A-6.

In some embodiments, the enclosed environment 102 may comprise a plurality of the indoor spaces 255 (e.g. rooms), as shown in FIG. 8, and a single or plurality of air treatment assemblies 110 may be provided. The central controller 254 may be provided to control the operation of the plurality of air treatment assemblies 110. The air treatment assembly 110 of FIGS. 7 and 8 may operate as describe in any one of the embodiments of FIG. 1A-5C.

In some embodiments, the enclosed environment 102 may comprise a building with a single or plurality of rooms. The rooms may be human occupied. The air treatment assembly 110 may be partially placed within the volume of the room where the humans are present and partially placed in the ambient environment 204 out of the building, such as shown in FIGS. 2A-3B, 5A, 5B, 7 and 8. In some embodiments, the air treatment assembly 110 may be placed within the volume of the room where the humans are present and may comprise access to the ambient environment 204 out of the building, such as shown in FIGS. 1A, 1B, 4A, 4B and 6. The air treatment assembly 110 may be placed in any suitable location in the volume of the room, such mounted to the ceiling 200, wall 208, placed in proximity or on the floor 220, or in window 206, for example. The indoor air 114 within the room may flow directly, i.e. from the volume of the room, into the indoor air inlet 120 without first flowing through ducts or plenum. The treated air exiting the air treatment assembly 110 may be expelled back into the volume of the room for providing the human occupants therein with good quality air.

In some embodiments, the enclosed environment 102 lacks a controlled supply of ventilation outdoor air, such as a machine controlled supply of ventilation outdoor air. A machine controlled supply of ventilation outdoor air may comprise the air management system, as described above, wherein the control of fresh air for ventilation, originating from the ambient environment 204, is typically controlled, such as by mechanical components or electrical components. In the absence of such ventilation, indoor air quality is likely to deteriorate over time as gas contaminants build up and may not be removed effectively. The air treatment assembly 110 may be configured to remove at least the portion of the at least one gaseous contaminant from this enclosed environment 102, thereby providing good quality air where there is a lack of supply of ventilation outdoor air.

It is noted in reference to FIGS. 1A-8, that any other suitable means besides dampers, such as valves, fans, blowers, or shutters, may be used to control the volume of air entering and/or exiting the air treatment assembly 110 and any components may be used for directing the indoor air 114 into the air treatment assembly 110.

In some embodiments of the systems shown in FIGS. 1A-8, a single or plurality of sensors 256 may be provided to detect levels of one or more contaminants, substances, gases (such as $CO_2$ and other gases), fumes, vapors, (such as VOCs) and/or any combination thereof. The sensors 256 may be placed in any suitable location within the enclosed environment 102 or in proximity thereto. Upon detection of a particular concentration of such contaminants, substances, gases, etc., the sensor(s) 256 may be configured to generate output data that can be transmitted to the control system or controller 254 for processing thereof.

The controller 254 may be operative to control any one or more of: the duration of time the adsorption cycle and the regeneration cycle, the volume of air flowing into the air treatment assembly 110 for scrubbing thereof, the volume of purge gas flowing into the air treatment assembly 110 for regeneration of the adsorbent material, and switching of the air treatment assembly 110 from the adsorption cycle to the regeneration cycle and vice versa.

In some embodiments, the controller 254 may be designed to control the duration and air volume during the adsorption cycle and the regeneration cycle and switching of the air treatment assembly 110 from the adsorption cycle to the regeneration cycle and vice versa, according to a preset schedule, or by sensing a predetermined level of the contaminants by the sensors and accordingly operating the adsorption cycle or regeneration cycle, or by determining an occupancy level of the enclosed environment 102 and, accordingly, operating the adsorption cycle or regeneration cycle, for example. The duration or volume during the adsorption cycle or regeneration cycle and switching therebetween may be controlled by a manual trigger or by externally signaled commands or any other suitable means.

In some embodiments, the controller 254 (i.e. a controller system) may be provided for controlling at least the cyclic operation of the adsorption mode and the regeneration mode by controlling the at least one airflow element.

In some embodiments, the controller 254 may be designed to activate the air treatment assembly 110, and/or control the operations of the switch 193 and/or the channel 194 in response to actual contaminant levels, occupancy, or preset schedules.

In some embodiments the controller 254 may be an electrical control system.

According to some embodiments, the air treatment assembly 110 of the present disclosure is configured to scrub contaminants from indoor air in an enclosed environment 102 which may have insufficient air ventilation means, such as inadequate access to ventilation outdoor air for example.

Scrubbing the contaminants from the indoor air 114 of an insufficiently ventilated enclosed environment 102 provides for good air quality. The air treatment assembly 110 may comprise access to regenerating outdoor air for regenerating the adsorbent material. Since the regenerating outdoor air is provided for regenerating the adsorbent material, a relatively small volume of regenerating outdoor air may be required, less than required for sufficient ventilation of the enclosed environment 102, and access to regenerating outdoor air may be limited to the regeneration cycle time period. Therefore the air treatment assembly 110 is configured to scrub contaminants from indoor air in the enclosed environment, which may have inadequate access to ventilation outdoor air.

In some embodiments, the enclosed environment 102 may contain air ventilation means yet due to relatively high human density therein the standard air ventilation may be insufficient and thus the amount of indoor contaminants may not be adequately managed by standard ventilation. In a non-limiting example, a classroom with high student density may have higher than acceptable levels of $CO_2$ constituting good air quality. Scrubbing the contaminants from the indoor air 114 of an insufficiently ventilated enclosed environment 102 provides for good air quality.

In some embodiments, the enclosed environment 102 may comprise sufficient means for standard, outside air ventilation for maintaining good air quality, yet reducing the contaminants in the indoor air 114 within the air treatment assembly 110 allows reducing the volume of fresh, outdoor air which is required for maintaining good air quality within the enclosed environment 102. Accordingly, the energy required to condition (i.e. change the temperature and/or humidity level) the outdoor air is reduced.

In some embodiments, in an enclosed environment 102 wherein the indoor air 114 is conditioned by radiation and/or other heating (or cooling) methods, it is desired to minimize the introduction of ventilating outdoor air, which would require much energy for conditioning the ventilating outdoor air. In a non-limiting example, wherein the enclosed environment 102 is in a cold climate and heating of the indoor air 114 is performed by a radiation heater, a furnace, a gas heater or any other suitable heating system, it is preferable to minimize introduction of outdoor air for ventilation. In accordance with the present disclosure, scrubbing the contaminants within the air treatment assembly 110 ensures the good quality of the indoor air is maintained while minimal or no volume of ventilating outdoor air is required.

In some embodiments, reducing the content of contaminants present in the enclosed environment 102 by scrubbing within the air treatment assembly 110 is more desirable than outside air ventilation for avoiding or minimizing introduction of potential pollutants and contaminants from the outdoor air into the enclosed environment 102.

Figure 10:
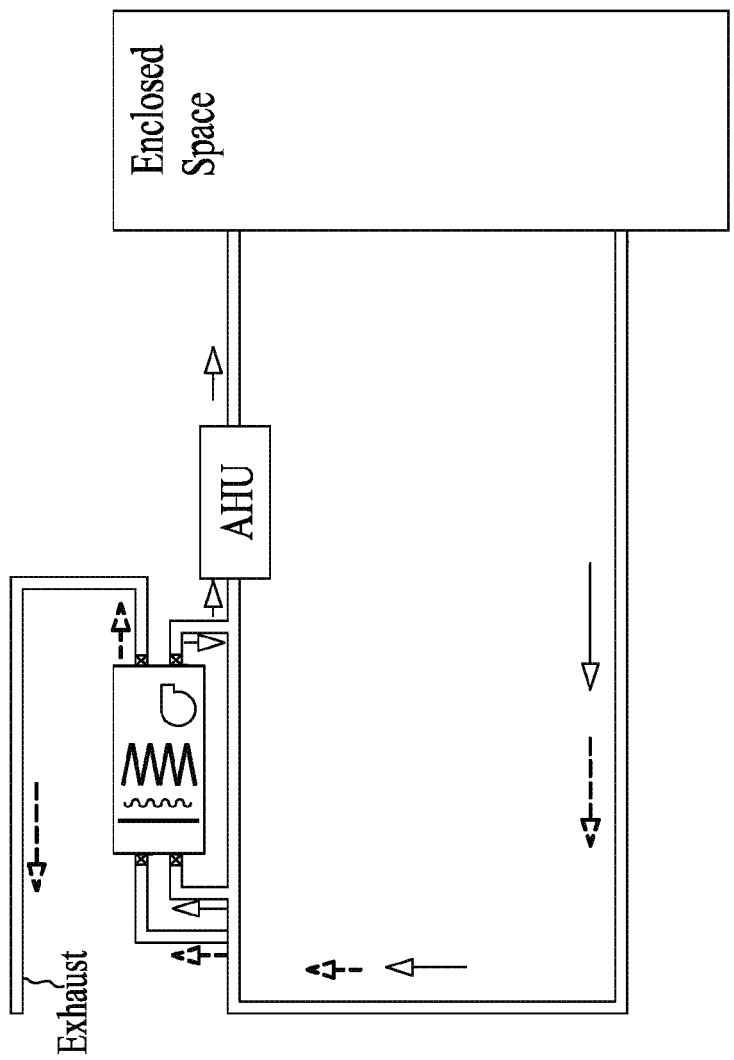

In some embodiments, for example, as shown in FIG. 9, the air treatment assembly can be configured to operate as a standalone system without association with external air management system. In some embodiments, however, the air treatment assembly may be operably coupled with other air management systems such as heating, ventilating and air-conditioning (HVAC) systems. An example embodiment of such an arrangement where the disclosed air treatment assembly is operably coupled to a HVAC system comprises an air handling unit (AHU) is shown in FIG. 10. The HVAC system can be configured to provide air circulation to the enclosed space to which it is connected. The HVAC system may further include an air handling unit ("AHU"), which may have both heating and cooling elements that modify temperature of the circulating air as it air flows and comes in contact with these elements. The HVAC system can further include air intake duct(s) connected to the AHU via circulation lines that allow intake of outside and/or indoor air into the system, the air treatment assembly and/or the AHU. In some embodiments, the HVAC system can also include exhaust duct(s) that receive return air and expunge it as an exhaust air into an external environment (e.g., after flowing through the air treatment assembly (for example, as a purging air)). In some embodiments, the HVAC system may also include scrubbers to at least reduce contaminants in the air flowing through the scrubbers. For example, scrubbers may be included in the HVAC system by incorporating them in the circulation lines and/or the AHU.

In some embodiments, the scrubbers or adsorbents may be regenerated to release the adsorbed contaminants into a purging air (e.g., indoor air introduced as purging air as described elsewhere in the instant disclosure) used to regenerate the adsorbents. Regeneration can be achieved by a combination of heating, purging, pressure change, electrical energy, and/or any combination thereof. In some embodiments, the release of adsorbed contaminant substances can be achieved by a combination of heating and purging with purging gas (e.g., indoor air). The cycle of adsorption and regeneration can be run periodically, for example at predetermined times, and/or as necessary (for example, upon detection of adsorption of a particular substance or a specific amount of a substance). In such examples, sensors may be used to determine if the concentration of contaminants has exceeded a threshold amount. As another example, sensors may be used to detect particular types of contaminants (and the adsorption-regeneration cycle may be initiated with or without regard to the amount of the contaminants). In some embodiments, the length of time that each cycle can be performed may depend on the substance adsorbed/purged, time that it takes to adsorb/purge a substance or a particular amount of the substance, interior conditions, exterior conditions, type of the enclosed space, energy usage, environmental regulations, commercial factors, and/or any other factors.

Further details of a standalone air treatment system and an HVAC system including an AHU are disclosed in applicant's PCT Publication No. WO/2014/078708 and U.S. Pat. No. 8,491,710, respectively, which are incorporated herein by reference in their entireties.

Figure 11:
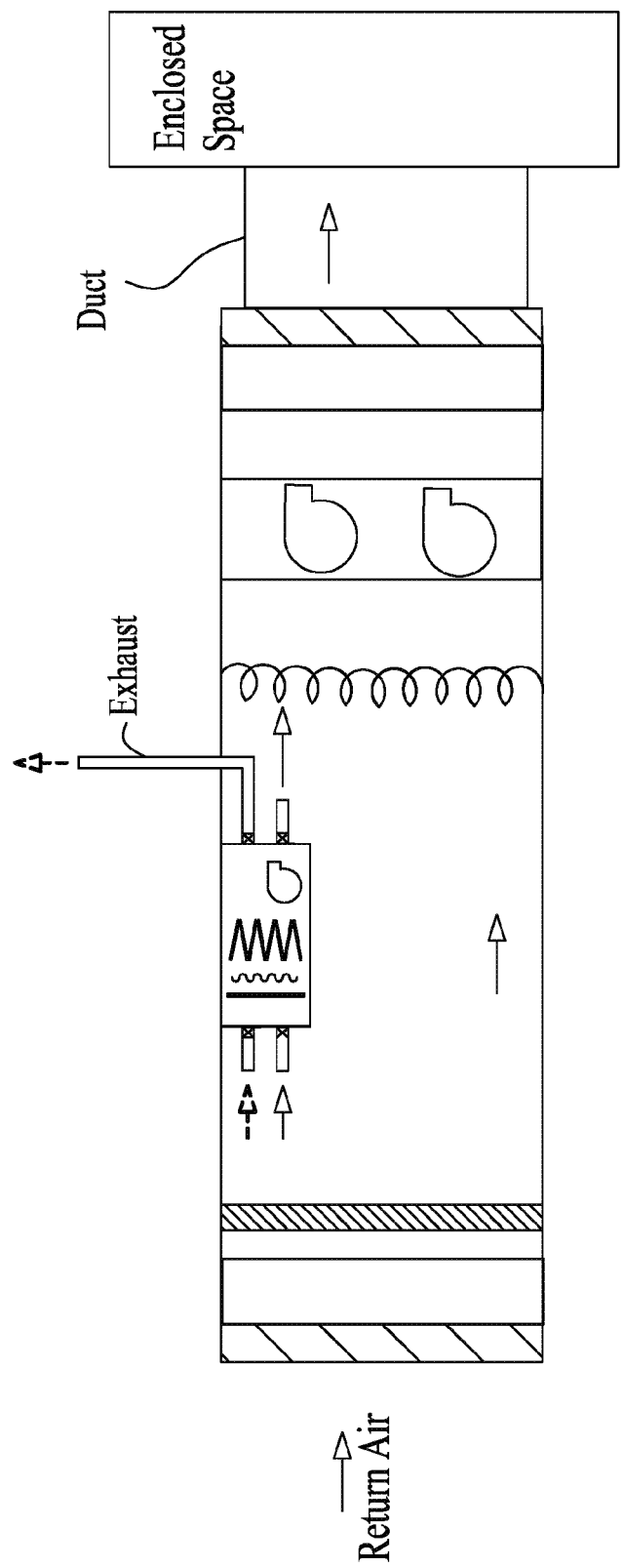

With reference to FIG. 11, in some embodiments, the air treatment assembly and the AHU may be configured and assembled as a single integrated system, resulting in an air treatment system that is reduced in size and cost. This may also facilitate the installation of the integrated system within an air management system, in comparison to installing two separate units—the AHU and the air treatment assembly. Additionally, in some embodiments, the components of the AHU may be utilized to operate the air treatment assembly and vice versa, thereby improving the efficiency of the adsorption of contaminants from the indoor air. As discussed in the instant disclosure, indoor air may flow into the air treatment assembly via indoor air inlets (e.g., indoor air may enter the AHU first and then enter the air treatment assembly from the AHU) and may exit the assembly via indoor air outlets, where the volume of incoming and outgoing air may be controlled via dampers. In some embodiments, the expelled air (e.g., scrubbed or treated air) may be released into the AHU, and in the case of exhaust may be released outside the indoor space.

In some embodiments, the now treated air may be directed to flow out of the air treatment assembly (e.g., via a feed and indoor air outlet damper). The treated air may combine with untreated indoor air (e.g., return air in FIG. 11 that didn't enter the assembly) and/or any makeup air if provided (e.g., outside air) and may then be directed to flow through the AHU. At the AHU, in some embodiments, the air may be conditioned (e.g. cooled or heated) by a conditioning element such as a heater, cooler, etc. The combined air may be directed to exit the AHU of the integrated system via an AHU indoor air outlet and damper, which may be positioned in an open state. The combined air can thereafter be introduced into the enclosed space as supply air. During a regeneration phase, a purging gas, (e.g., an indoor air as discussed with respect to FIGS. 1E-1H) may flow into the integrated system to regenerate the adsorbents in the air treatment assembly and/or AHU.

In some embodiments, the air treatment assembly may be configured to intercept and receive only a portion of the indoor air flowing within the AHU. In some embodiments, between about 1% to about 50%, about 3% to about 25%, about 5% to about 15%, including all values and sub ranges in between, of the indoor airflow may be diverted to the air treatment assembly, and a remainder of the indoor air can bypass the assembly. Further details of an HVAC system including an AHU are disclosed in applicant's PCT Publication No. WO/2014/047632, which is incorporated herein by reference in its entirety.

Figure 12A:
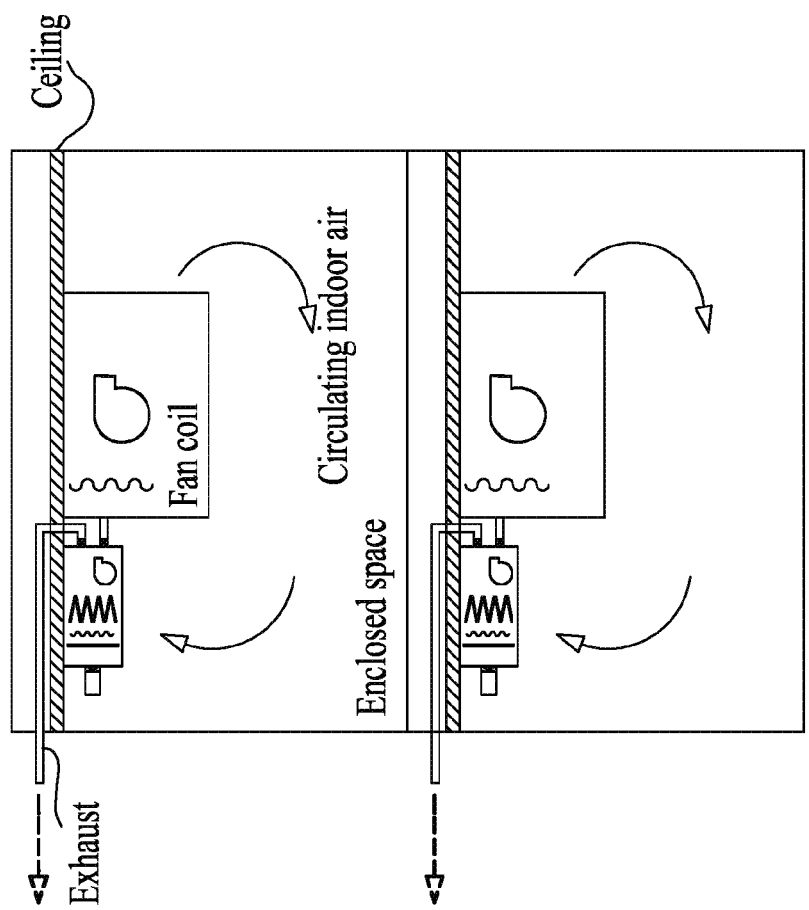
Figure 12B:
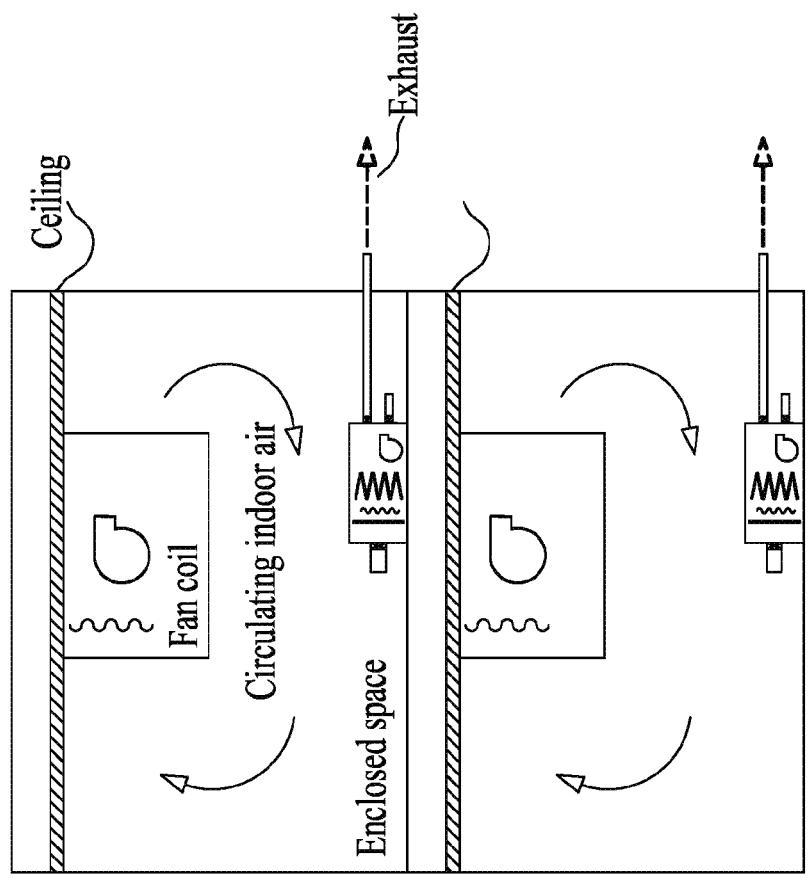

With reference to FIGS. 12A-B, in some embodiments, the disclosed air treatment system may be configured to be operably coupled to an air management system that includes air circulation units such as fan-coil units. The fan-coil unit may comprise a housing including a fan and coils and adsorbents. The coils may be cooled or heated by a fluid, examples of which include water or fluid supplied by a Variable Refrigerant Flow (VRF) system. The coils may comprise a cooling coil and/or a heating coil and/or any other suitable cooling or heating means, such as radiators, electrical heaters, chillers, heat exchangers, nozzles or jets, for example. The fan may draw the scrubbed air from the air treatment assembly to enter into the fan-coil unit, and flow the scrubbed air in the vicinity of coils for conditioning (e.g., heating or cooling) thereof. The conditioned air may be released into the indoor space and may eventually return back to the air treatment assembly unit as an indoor air (to be scrubbed or be used as a purging gas airflow as disclosed herein). In some embodiments, the air treatment assembly and the fan-coil unit may be in the vicinity of each other (e.g., FIG. 12A), and the transfer of indoor air between the two units may take place via a conduit. In yet other embodiments, the air treatment assembly and the fan-coil unit may not be close to each other (e.g., FIG. 12B), and the transfer of indoor air between the two units may take place though the indoor space. Fan coil units may be placed within a room or space, typically within a recess in the ceiling or walls of the room. Further, a fan coil unit may be placed in a plenum adjacent to the room. In some embodiments, the circulating indoor air flows between the fan-coil unit, the air treatment assembly and the room substantially without reliance on ducts (i.e. a ductless supply). In some embodiments, the fan-coil unit may be operationally coupled to at least one additional air treatment component such as an air ionizer, an ozone source, a source of radiation, a membrane, foam, paper, fiberglass, a heater, a particle filter, an ultraviolet anti-microbial device, an ion or plasma generator, an oxide, a catalyst or a chemical catalyst. In some cases, the additional air treatment component may be placed within the fan-coil unit. As another example, the additional air treatment component may be placed within the indoor space. In some embodiments, the treated indoor air may flow out of the fan-coil unit via a duct and the additional air treatment component may be placed within the duct. Further details of an HVAC system including air circulation units such as fan-coil units are disclosed in applicant's PCT Publication No. WO/2013/074973, which is incorporated herein by reference in its entirety.

Figure 13:
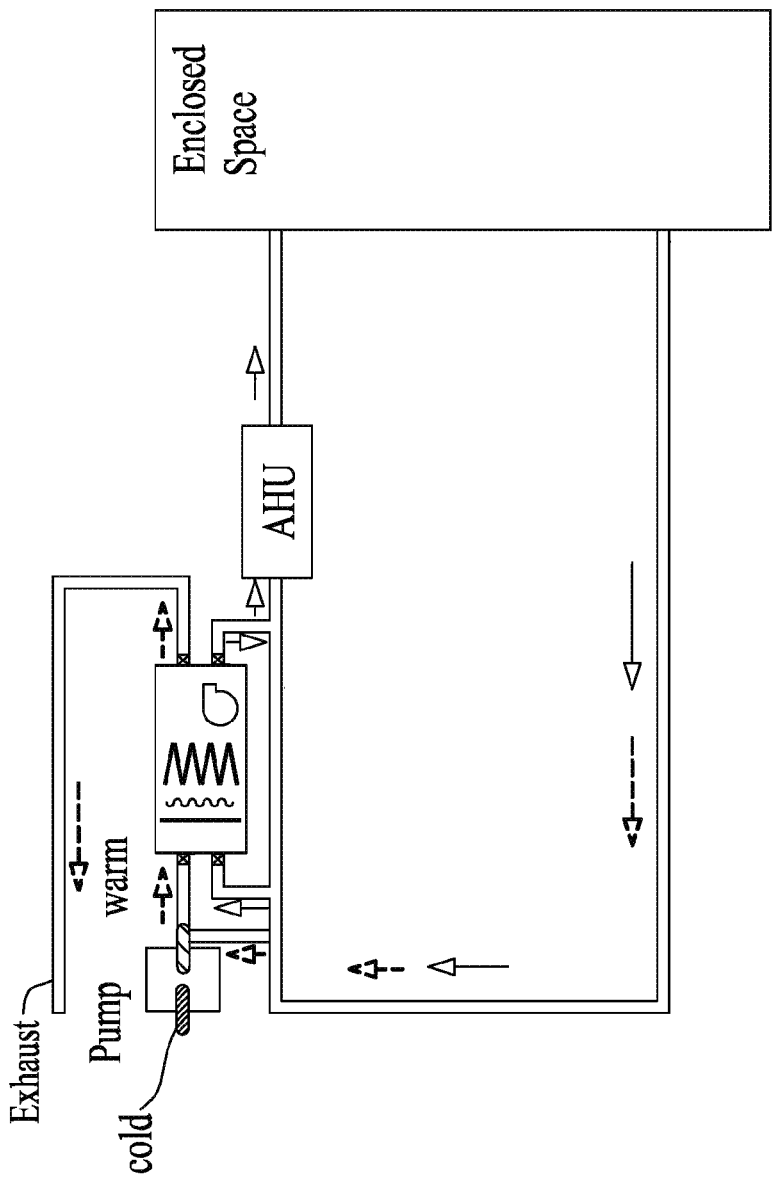

With reference to FIG. 13, in some embodiments, the disclosed air treatment system may be configured to be operably coupled to an air management system that includes a heat pump for heating purging gas airflow and/or adsorbent material of the air treatment assembly. In some embodiments, the heat pump may use fluids and compressors in a closed chiller loop of condensation and evaporation, also referred to as a "condenser-evaporator loop", so as to move heat opposite its usual direction, namely removing heat from a lower temperature evaporator region and adding heat to a higher temperature condenser region. In this way, a heat pump can act to continuously cool the ambient environment in a cold region (i.e. the evaporator side or cold side) while heating the ambient in a warmer region (the condenser side or warm side). Viewed as a refrigerator or chiller, it enables the cooling of indoor air below its surrounding temperature; viewed as a heater, it delivers heat where needed. For example, in the embodiment shown in FIG. 13, air (indoor air to be scrubbed or used as purging airflow) may be received at the heat pump to be conditioned (e.g., heated or cooled) and then directed into the air treatment assembly via the inlets. For instance, a heated purging gas airflow may be flown through the adsorbent of the air treatment assembly to facilitate the regeneration of the absorbent during the adsorption-regeneration cycle of the assembly. In some embodiments, the heat pump may be configured to remove heat from circulating air and concurrently heat the purge gas.

In some embodiments, a heat pump may be installed in the air treatment system embodiment depicted in FIG. 10, i.e., a heat pump may also be optionally included to an air treatment system including an air treatment assembly and a HVAC having an AHU. A schematic of such an arrangement is shown in FIG. 13. In some embodiments, the heat pump may be a heat pump within an HVAC system. Further details of air treatment system including a heat pump are disclosed in applicant's PCT Publication No. WO/2014/015138, which is incorporated herein by reference in its entirety.

Figure 14:
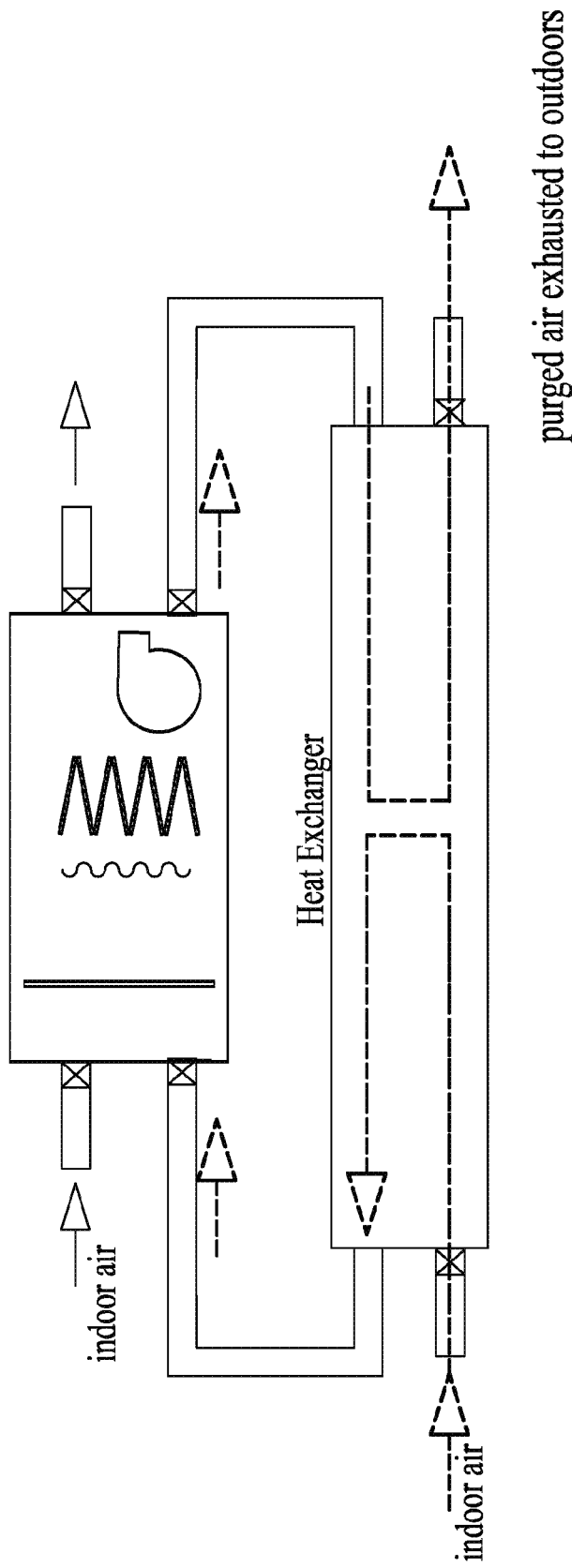

With reference to FIG. 14, in some embodiments, the disclosed air treatment system may be configured to be operably coupled to a heat exchanger that is configured to facilitate thermal communication between the incoming indoor airflow and the exhausted purging airflow exhausted outside the indoor space. The incoming indoor airflow may be indoor air designated for purging air. The thermal communication may include any type of heat transfer, such as by contact, convention or conduction, for example. In a non-limiting example, the heat exchanger assembly may comprise a shell and tube configuration, an air coil configuration, a plate configuration, a fin configuration or a counter-flow configuration. In some embodiments, the heat exchange may be facilitated by having the conduits carrying the incoming indoor air and the exhaust purging air to run in parallel and in close thermal communication over an extended length of these conduits. Thermal communication can be assisted by increasing a shared surface area of the parallel conduits. In some embodiments, the two conduits may be arranged so that the incoming indoor air and the exhaust purging air flow in opposite directions, substantially increasing the heat exchange rate. The heated indoor air may then be transported by a conduit into the air treatment assembly via an indoor air inlet. Such a heated air may be used to regenerate the adsorbent as discussed throughout the instant disclosure, while the exhaust purge air may be released outside the indoor space or it may be reused to heat additional indoor air if its temperature is still elevated enough (e.g., above the ambient temperature or the temperature of the incoming indoor air).

In some embodiments, the heat exchanger may be configured to transfer heat from the exhausted purging airflow to the incoming purging airflow in an amount approximately equal to H given by the expression $H=(T_e-Ti) \times E \times F$, wherein E is an efficiency coefficient of the heat exchanger, F is a flow rate of the incoming purging airflow, Ti is the temperature of the incoming indoor air (e.g., incoming purging indoor), and $T_e$ is the temperature of the exhausted purging airflow. The system may further comprise a fan to at least aid in the flow of indoor air and/or the purging airflow. In some embodiments, sensors may be used to determine when to allow thermal communication between the incoming purging air and outgoing exhausted air. For example, a temperature sensor may be used to determine when $T_e > T_i$, so that thermal communication may be allowed and heat may be transferred from the exhaust to the incoming purging air (e.g., indoor purging air). Further details of air treatment system including a heat exchanger are disclosed in applicant's PCT Publication No. WO/2015/042150, which is incorporated herein by reference in its entirety.

Figure 15:
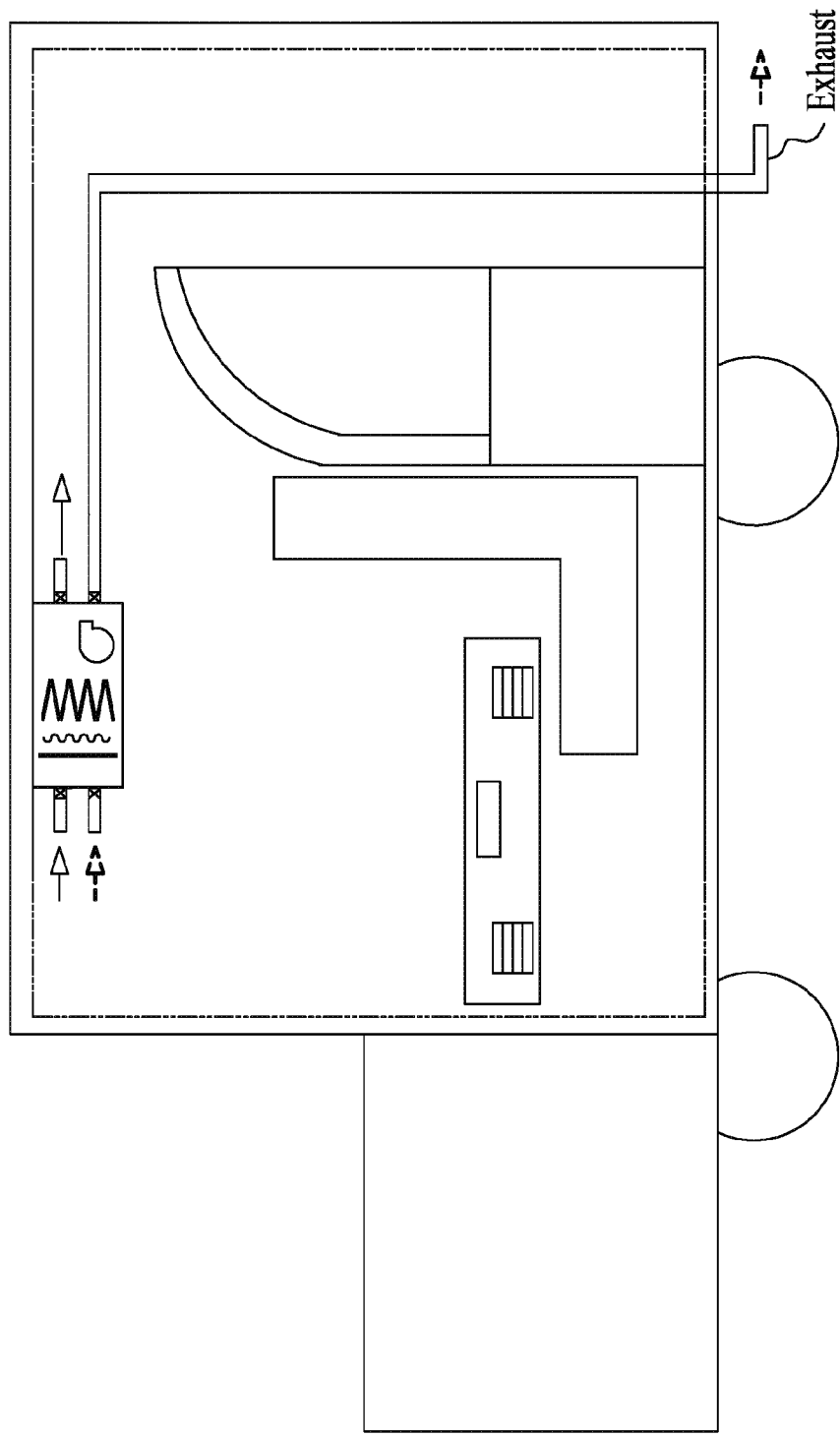

With reference to FIG. 15, in some embodiments, the disclosed air treatment system may be configured to operate within enclosed cabin spaces of a transportation system such as those in vehicles, ships, aircrafts, and/or the like. In particular, such confined places may have elevated $CO_2$ levels from high levels of human/animal occupancies, and the air treatment assembly may be configured to remove $CO_2$ from cabin air. In some embodiments, an air treatment assembly may be provided within a cabin to reduce the concentration of contaminants such as $CO_2$ contained in cabin air. The air treatment assembly may be configured with cabin air inlets for receiving cabin air for scrubbing during adsorption mode or as a purging airflow during regeneration mode. In some embodiments, air treatment assembly may be configured with cabin air outlets provided for releasing scrubbed or treated cabin air out of the air treatment assembly. For example, an outlet may be configured to return the airflow back into the cabin after passing over and/or through an adsorbent material during the adsorption mode. Similarly, in some embodiments, an outlet may be configured to direct exhaust purge air containing contaminants such as $CO_2$ out of the assembly and into the exhaust system of the transportation system (e.g., vehicles, ships, aircrafts, etc.) during regeneration mode.

In some embodiments, sensors may be provided to detect properties of the cabin air, such as a $CO_2$ sensor. The $CO_2$ sensor may be arranged within the cabin space of, for example, the passenger car or submarine, such as near the cabin air inlet and/or cabin air outlet or any suitable location for detecting the $CO_2$ concentration within the cabin air before and/or after scrubbing thereof in the air treatment assembly. The sensor may be configured to generate a signal corresponding to a $CO_2$ concentration within the cabin air and transmit the signal to the controller system 254. The controller system 254 may, according to the received signal, activate the air treatment assembly 254. For example, the controller system 254 may be configured to receive the cabin $CO_2$ signal and control the operative mode of the air treatment system according to the concentration of $CO_2$ in the cabin air. Further details of air treatment system within enclosed cabin spaces such as transportation systems are disclosed in applicant's PCT Application Publication Nos. WO/2014/153333 and WO/2014/176319, which are incorporated herein by reference in their entireties.

Various implementations of some of embodiments disclosed, in particular at least some of the processes discussed (or portions thereof), may be realized in digital electronic circuitry, integrated circuitry, specially configured ASICs (application specific integrated circuits), computer hardware, firmware, software, and/or combinations thereof. These various implementations, such as associated with the controller 254, for example, may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Such computer programs (also known as programs, software, software applications or code) include machine instructions/code for a programmable processor, for example, and may be implemented in a high-level procedural and/or object-oriented programming language, and/or in assembly/machine language. As used herein, the term "machine-readable medium" refers to any computer program product, apparatus and/or device (e.g., non-transitory mediums including, for example, magnetic discs, optical disks, flash memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a LCD (liquid crystal display) monitor and the like) for displaying information to the user and a keyboard and/or a pointing device (e.g., a mouse or a trackball, touchscreen) by which the user may provide input to the computer. For example, this program can be stored, executed and operated by the dispensing unit, remote control, PC, laptop, smart-phone, media player or personal data assistant ("PDA"). Other kinds of devices may be used to provide for interaction with a user as well. For example, feedback provided to the user may be any form of sensory feedback (e.g., visual feedback, auditory feedback, or tactile feedback), and input from the user may be received in any form, including acoustic, speech, or tactile input. Certain embodiments of the subject matter described herein may be implemented in a computing system and/or devices that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components.

The components of the system may be interconnected by any form or medium of digital data communication (e.g., a communication network). Examples of communication networks include a local area network ("LAN"), a wide area network ("WAN"), and the Internet. The computing system according to some such embodiments described above may include clients and servers. A client and server are generally remote from each other and typically interact through a communication network. The relationship of client and server arises by virtue of computer programs running on the respective computers and having a client-server relationship to each other.

Any and all references to publications or other documents, including but not limited to, patents, patent applications, articles, webpages, books, etc., presented anywhere in the present application, are herein incorporated by reference in their entirety.

Example embodiments of the devices, systems and methods have been described herein. As may be noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and devices which may further include any and all elements/features from any other disclosed methods, systems, and devices, including any and all features corresponding to translocation control. In other words, features from one and/or another disclosed embodiment may be interchangeable with features from other disclosed embodiments, which, in turn, correspond to yet other embodiments. Furthermore, one or more features/elements of disclosed embodiments may be removed and still result in patentable subject matter (and thus, resulting in yet more embodiments of the subject disclosure). Also within the scope of some of the embodiments of the present disclosure is the specific lack of one or more features that may be present in the prior art. In such embodiments, patentable claims may include negative limitation to indicate such lack of one or more features taught in the prior art in, for example, any one or more of certain disclosed apparatuses, systems, and methods.

What is claimed is:

1. An air treatment system, comprising:
an air treatment assembly having:
two or more air inlets configured to receive airflow from an enclosed environment;
a regenerable adsorbent material;
at least one airflow element for directing the airflow to flow through the air treatment assembly;
an indoor air outlet for expelling the airflow, treated by the regenerable adsorbent material, from the air treatment assembly; and
a purge air outlet configured to expel a purging airflow out of the air treatment assembly to an external environment outside of the enclosed environment during a regeneration mode;
wherein the air treatment system is configured to operate cyclically in at least two modes:
an adsorption mode whereby a first air inlet of the one or more air inlets is configured to receive indoor airflow from the enclosed environment, and the regenerable adsorbent material is configured to adsorb at least one gaseous contaminant contained in the indoor airflow, and
the regeneration mode whereby a second air inlet of the one or more air inlets is configured to receive indoor airflow as the purging airflow, the purging airflow configured to regenerate the regenerable adsorbent material by removing at least a portion of the at least one gaseous contaminant adsorbed by the regenerable adsorbent material;

a closed loop return path for connecting the purge air outlet to the second air inlet so that at least a portion of the expelled purging airflow re-enters the air treatment assembly via the second air inlet, at least one of:
a fan-coil unit operationally coupled to the air treatment assembly and located within or adjacent to the enclosed environment, wherein the indoor air outlet is configured to expel the treated airflow so as to direct the treated airflow into or towards the fan-coil unit, and
an air handling unit (AHU) operationally coupled to the air treatment assembly and configured to at least one of heat and cool the treated airflow, wherein the indoor air outlet is configured to expel the treated airflow so as to direct the treated airflow into or towards the AHU, and
a controller system for controlling at least the cyclic operation of the adsorption mode and the regeneration mode cycle by controlling the at least one airflow element,
wherein the first air inlet and the second air inlet join to form a single air inlet for receiving indoor airflow into the air treatment assembly.

2. The air treatment system of claim 1, further comprising one or more return sensors for measuring a concentration of gaseous contaminant in the expelled purging airflow, wherein an amount of the portion of the expelled purging airflow is determined by the controller system based on a measurement of the one or more return sensors.

3. The air treatment system of claim 2, further comprising a return path airflow element, wherein the controller system is configured to control the amount of the portion of the expelled purging airflow using the return path airflow element.

4. The air treatment system of claim 1, further comprising one or more sensors for measuring a concentration of the at least one gaseous contaminant and/or detecting a presence of the at least one gaseous contaminant, wherein the one or more sensors are configured to generate a signal corresponding to the concentration of the at least one gaseous contaminant and/or the presence of the at least one gaseous contaminant, and transmit the signal to the controller system.

5. The air treatment system of claim 1, wherein the at least one airflow element comprises at least one of a fan, a blower, a damper and a shutter.

6. The air treatment system of claim 1, wherein the air treatment assembly is configured as a portable unit.

7. The air treatment system of claim 1, further comprising a heat source for heating the purging airflow, the heat source selected from the group consisting of: a heat pump, a furnace, solar heat, an electrical coil and hot water.

8. The air treatment system of claim 1, wherein the at least one gaseous contaminant is selected from the group consisting of: carbon dioxide, volatile organic compounds, formaldehyde, sulfur oxides, radon, ozone, nitrous oxides and carbon monoxide.

9. The air treatment system of claim 1, wherein the adsorbent material comprises at least one of: activated carbon, carbon particles, solid amines, solid supported amine, molecular sieves, porous silica, porous alumina, carbon fibers, metal organic frameworks, porous polymers and polymer fibers.

10. The air treatment system of claim 1, further comprising a heat exchanger configured to transfer heat from the purging airflow exiting the air treatment assembly to an indoor air incoming as a fresh purging airflow.

11. An air treatment system comprising:
an air treatment assembly having:
a first indoor air inlet configured to receive indoor airflow from an enclosed environment;
a regenerable adsorbent material configured to adsorb at least one gaseous contaminant contained in the indoor airflow;
an indoor air outlet for expelling the indoor airflow treated by the adsorbent material from the air treatment assembly back into the enclosed environment;
a purge air inlet configured to receive and direct indoor air from the enclosed environment over and/or through the adsorbent material as a purging airflow for removing at least a portion of the at least one gaseous contaminant adsorbed by the adsorbent material; and
a purge air outlet configured for expelling the purging airflow out of the air treatment assembly to an external environment outside of the enclosed environment during a regeneration mode,
a heat exchanger configured to transfer heat from the purging airflow exiting the air treatment assembly to an indoor air incoming as a fresh purging airflow;
a closed loop return path for connecting the purge air outlet to a second air inlet so that at least a portion of the expelled purging airflow re-enters the air treatment assembly via the second air inlet, and
at least one of:
a fan-coil unit operationally coupled to the air treatment assembly and located within or adjacent to the enclosed environment, wherein the indoor air outlet is configured to expel the indoor airflow treated by the adsorbent material into or towards the fan-coil unit, and
an air handling unit (AHU) operationally coupled to the air treatment assembly and configured to at least one of heat and cool the treated airflow, wherein the indoor air outlet is configured to expel the indoor airflow treated by the adsorbent material into or towards the AHU,
wherein the first air inlet and the second air inlet join to form a single air inlet for receiving indoor airflow into the air treatment assembly.

12. The air treatment system of claim 11, wherein configuration of the heat exchanger is selected from the group consisting of: a shell and tube configuration, an air coil configuration, a plate configuration, a counter-flow configuration and a fin configuration.

13. The air treatment system of claim 11, further comprising: an incoming purging airflow conduit for transferring incoming purging airflow from the heat exchanger to the air treatment assembly, and an exhausted purging airflow conduit for transferring exiting purging airflow from the air treatment assembly to the heat exchanger.

14. The air treatment system of claim 11, wherein the heat exchanger is further configured to allow the exiting purging airflow to combine with the incoming purging airflow.

15. The air treatment system of claim 14, further comprising one or more sensors for measuring a concentration of gaseous contaminant in the airflow, wherein the heat exchanger is configured to allow the exiting purging airflow to combine with the incoming purging airflow based on a measurement of the one or more sensors.

* * * * *